(12) United States Patent
Oliver et al.

(10) Patent No.: US 9,551,611 B2
(45) Date of Patent: Jan. 24, 2017

(54) PROTECTIVE PRODUCT REPORTING SYSTEM

(71) Applicants: Ian James Oliver, Canberra (AU); Stephen Edward Ecob, Sydney (AU)

(72) Inventors: Ian James Oliver, Canberra (AU); Stephen Edward Ecob, Sydney (AU)

( * ) Notice: Subject to any disclaimer, the term of this patent is extended or adjusted under 35 U.S.C. 154(b) by 0 days.

(21) Appl. No.: 14/333,530

(22) Filed: Jul. 17, 2014

(65) Prior Publication Data

US 2015/0041663 A1 Feb. 12, 2015

Related U.S. Application Data

(60) Provisional application No. 61/847,461, filed on Jul. 17, 2013.

(51) Int. Cl.
*G01J 1/42* (2006.01)
*G01W 1/00* (2006.01)
*G01J 1/02* (2006.01)
*G01W 1/12* (2006.01)

(52) U.S. Cl.
CPC ............... *G01J 1/429* (2013.01); *G01J 1/0219* (2013.01); *G01W 1/00* (2013.01); *G01W 1/12* (2013.01)

(58) Field of Classification Search
CPC ....................................................... G01J 1/429
See application file for complete search history.

(56) References Cited

U.S. PATENT DOCUMENTS

| | | |
|---|---|---|
| 3,710,115 A | 1/1973 | Jubb |
| 7,265,358 B2 | 9/2007 | Fontaine |
| 7,383,072 B2 | 6/2008 | Edmonson |
| 2011/0181410 A1* | 7/2011 | Levinson et al. ............. 340/540 |
| 2011/0191272 A1* | 8/2011 | McGuire ......................... 706/11 |
| 2011/0234598 A1 | 9/2011 | Scarola et al. |
| 2011/0247718 A1* | 10/2011 | Samain ............................ 141/1 |
| 2011/0298613 A1* | 12/2011 | Ben Ayed ................ 340/539.11 |
| 2012/0153179 A1* | 6/2012 | Tew .............................. 250/372 |

FOREIGN PATENT DOCUMENTS

WO    WO-2005036110 A1    4/2005

* cited by examiner

*Primary Examiner* — David Porta
*Assistant Examiner* — Hugh H Maupin

(57) ABSTRACT

A reporting system includes a mobile computing device that wirelessly communicates with one or more sensors to track the use of a protective product. Reports are provided on the mobile computing device to remind and motivate a user of the protective product to use it at times most beneficial for receiving the intended protection from it.

2 Claims, 15 Drawing Sheets

Fig. 4

PROTECTIVE PRODUCT REPORTING SYSTEM

BACKGROUND

Ultraviolet (UV) radiation, primarily caused by sun radiation, causes cancer. In Australia alone, during a one year period over 400,000 people were diagnosed with a new cancer including 1800 fatalities caused by sun exposure. The personal suffering and loss of income through related sickness as well as cost of medical care are a significant concern for Australia and many other countries. Presently, one in five North Americans and one in two Australians will develop skin cancer in their lifetime. Ultraviolet (hereafter referred to as UV) radiation is divided into three main ranges: UV-A (315 to 400 nm); UV-B (280 to 315 nm); and UV-C (100 to 280 nm). Naturally occurring UV radiation consists of UVA and UVB components. UVB is believed to be the main cause of skin cancer while UVA is known to cause premature skin aging and may also contribute to skin cancer

SUMMARY

Embodiments of a system are described. In one embodiment, the system is a UV sensor system. The system includes a grid of one or more UV sensors, a processor coupled to the UV sensors, and a mobile computing device. The UV sensors are configured to measure UV radiation. The mobile computing device is configured to communicate with the UV sensors and calculate positions relative to the UV sensors and time durations at each position. The processor is configured to receive UV radiation measurements from the UV sensors and execute an algorithm indicating cumulative UV exposure for a user based on the positions and time durations. Other embodiments of the system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 4 depicts one embodiment of a table of configuration parameters.

FIG. 8D depicts one embodiment of some possible positions where the device 199 may be placed.

Throughout the description, similar reference numbers may be used to identify similar elements.

DETAILED DESCRIPTION

Figure 1:
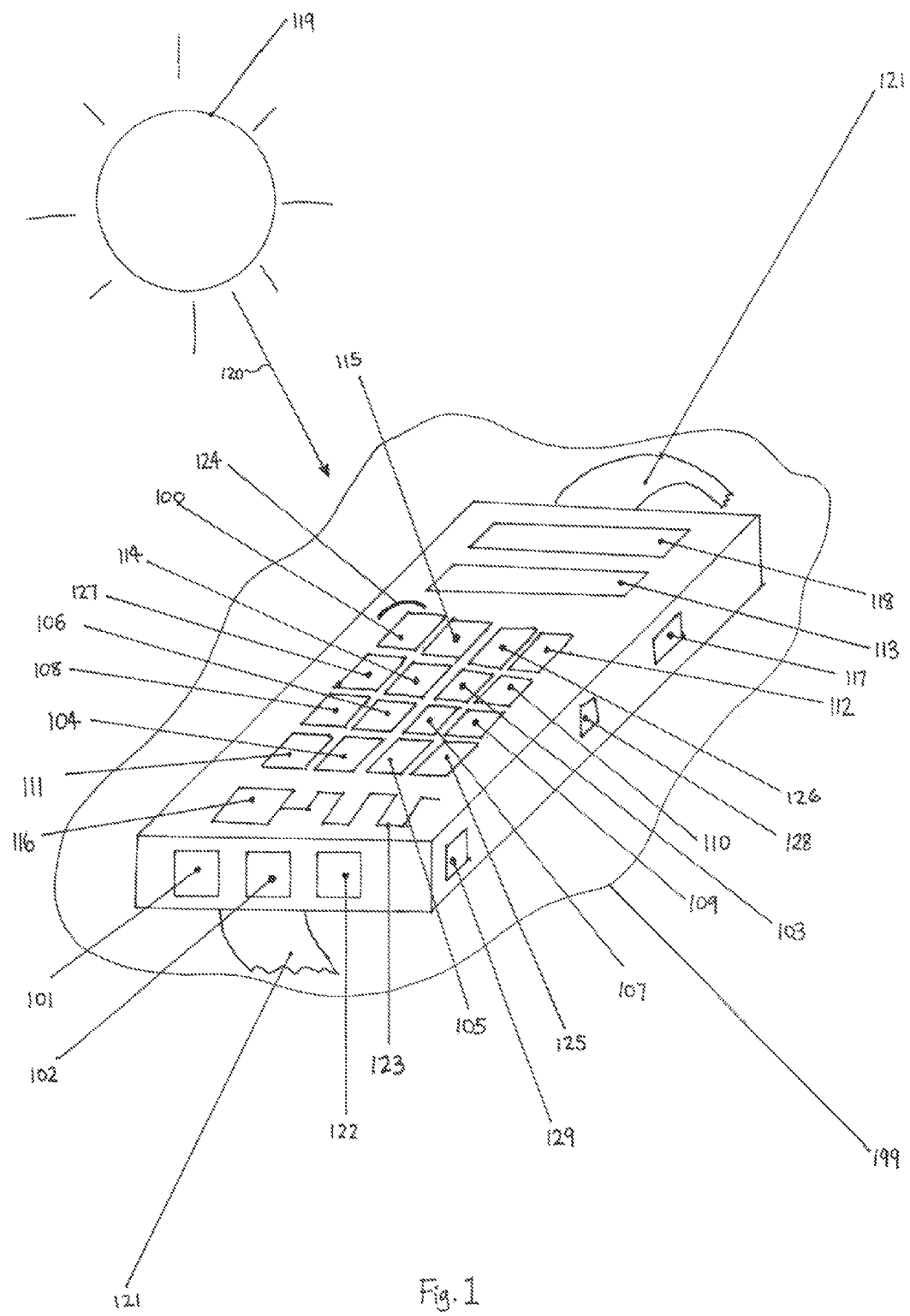
FIG. 1 depicts one embodiment of a device that contains a multiplicity of a variable number of sensors, display, input, processor and communication modules. The device casing may come in many different sizes and enclosure designs including various different attachment options to attach to people, cloths, hats, people.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Protective products such as clothing, hats, umbrellas and sunscreens are used to protect the human skin from UV exposure. Sunscreens vary in their formulations and properties. Not all are appropriate for children, for example. It is also important not to use expired sunscreens. Sunscreens are assigned ratings for the amount of protection they provide, including the SPF rating. Additional ratings such as "water resistant" and "highly water resistant" are also important indicators of the sunscreens effectiveness when worn in water. Sunscreens do not protect indefinitely and must be reapplied. Sunlight and natural body oils break down the sunscreen and the efficacy of sunscreen can also be significantly degraded by human body perspiration, water, water agitation (from waves or movement through the water) as well as contact with sand. Humidity may also play a role in reducing the effectiveness of sunscreens. Clothing such as shirts allows some UV to reach the skin, so often a UV protection factor is specified even for clothing.

The intensity of direct UV radiation from the sun can be forecast for a given day and locale by weather experts, but actual UV intensity is highly localised due to effects such as variable cloud cover. Indirect UV radiation can also be experienced via reflection or scattering in the atmosphere. This indirect exposure varies widely from location to location as it is dependent on highly variable factors such as the UV reflectivity of the ground and surrounding objects. Reflection of UV radiation can be caused by water, snow, sand, buildings and other surfaces. Because of the significant and wide variations in reflected UV radiation they cannot easily be factored into published UV warnings, leading to potentially significant underestimation of UV radiation exposure.

Ground reflection of UV is typically low (perhaps 10-20%), but may be up to 40% for sand and up to 80% for snow. For people spending time on snow, with up to 80% extra radiation from reflection, underestimation of UV exposure can be very significant. The intensity of UV radiation from the sun increases with altitude. In the case of activities such as skiing this is highly significant.

UV radiation also affects peoples appearance, through effects such as tanning and premature skin aging. Many people wish to minimise exposure to UV in consideration of these factors, even apart from concerns of susceptibility to skin cancer. The human face is of integral importance to overall appearance and esteem. It is obviously desirable to avoid damage to it from cancer, cancer treatment and premature skin aging. Many people also wish to minimise tanning of their skin purely from an aesthetic viewpoint. Hats and umbrellas are often used to this end, but facial exposure to UV radiation may still be significant due to indirect radiation. Babies and young children are very sensitive to UV radiation. Parents may often be aware of the importance of avoiding direct exposure to sunlight but unable to appreciate the dangers of indirect UV exposure and the severe damage that it can do to young skin. Constant monitoring and consideration is required, especially at the beach, near water, near snow or at higher altitudes. In these areas parents may believe that their child is protected from direct exposure, but fail to take account of reflected and scattered UV radiation. This is highly important, as susceptibility to cancer causing damage is significantly higher in the early years of life. Another problem with existing arrangements for UV protection is that children often fail to understand the importance of wearing hats and deliberately avoid their use, thus compromising their UV protection.

The amount of UV that a person's skin may be exposed to before skin damage and cancer risk begins is dependent on that person's skin type. Skin type categorisations such as the Fitzpatrick phototype scale can be used to specify skin type. It is possible to use this skin type information in order to calculate a safe sun exposure time limit. Weather agencies provide UV forecasts, typically using the UV index. This is intended to allow people to select their sun protection strategy according to the expected amount of UV. It is difficult for lay people to combine information about skin type, SPF, water resistance and the UV forecast and use it to come up with a good sun protection strategy. Complicating factors such as variable cloud cover, time spent in water, perspiration, altitude and reflection make it difficult for people to develop effective UV protection strategies, particularly when it comes to important details such as determining safe exposure times before sunscreen re-application is required. Simple strategies for the use of sunscreen are commonly used. "Apply at the start of the day and reapply every two hours" is a typical strategy—simple and effective at reducing UV exposure, but highly inconvenient when one considers the expense and time taken in reapplying sunscreen several times per day. The human eye is susceptible to damage from UV radiation. While glasses may provide differing levels of protection, UV radiation may also reach the eye from side, bottom and top angles where there is no lens.

A further complication for sun protection strategies is that skin requires some exposure to UV radiation for the natural production of vitamin D. Excessive use of sun protection can lead to vitamin D deficiency, which ironically may increase susceptibility to skin cancer. Vitamin D may be best generated from UVB exposure. The ratio of UVA to UVB light from the sun lies in the range 10:1 to 20:1. When the proportion of UVA to UVB exceeds that of natural sunlight then UVA acts to impair Vitamin D production. This type of unhealthy proportion can be caused by sun exposure through glass, which filters UVB but not UVA. People sitting near windows for long periods (such as office workers or car commuters) can experience this type of imbalance, which may cause Vitamin D deficiency. A high UVB to UVA ratio (high UVB and low UVA) is the best for creating vitamin D in the body, and this occurs when the sun is highest in the sky—exactly the time that is often suggested to be avoided.

Increased UVA exposure and consequent decreased cutaneous Vitamin D(3) levels may be partially responsible for the increasing incidence of melanoma, as Vitamin D deficiency is believed to increase susceptibility to melanoma.

It can be seen that a need exists for improved arrangements that allow people to easily come up with UV exposure strategies that minimise the risk of skin cancer from excessive UV exposure whilst allowing the natural synthesis of vitamin D from a healthy level of UVB exposure. Knowledge of many aspects of solar radiation exposure is limited. A need exists for further research into solar radiation exposure, particularly research based on long term, accurate measurement of solar radiation exposure of a large sample population. Provision of an affordable and convenient system for the collection of such data to researchers is highly desirable for improved public health.

Everyone has a different skin complexion genetically determined and largely controlled by melanin content. To simplify categorisation of the huge variety of different types of skin, the Fitzpatrick Phototype Scale categorises all people into one of six Skin Types:

Skin Type 1. Never tans and always burns easily. Genetic Origin may include for example, Scandinavian or Celtic. Maximum time in the sun=67 min/UVI.

Skin Type 2. Skin is a little darker than Type 1. Tans to a small degree but still has a high chance to burn. Genetic Origin may include for example Caucasian. Maximum time in the sun=100 min/UVI.

Skin Type 3. Skin is light brown. Tans easily with a lower chance to burn. Genetic Origin may include, for example Central European. Maximum time in the sun=200 min/UVI.

Skin Type 4. Skin is light brown ranging to olive and with very good tanning ability and very low likelihood to sunburn. Genetic origin may include South Mediterranean or native American. Maximum time in the sun=300 min/UVI.

Skin Type 5. Skin is olive in colour and is not sensitive to sun with a very low chance to sunburn. Genetic origins include Middle Eastern, Asian, Hispanic or African. Maximum time in the sun=400 min/UVI.

Skin Type 6. Skin is deeply pigmented as well as not sensitive to the sun and never burns. Genetic origin includes African. Maximum time in the sun=500 min/UVI.

The skin requires moisturization when it is exposed to many environmental factors as well as needing attention depending on an individual skin type and condition. Dryness and humidity as well as heat, cold, wind, sweat from exercise, water exposure, strength and solar radiation including UV radiation. Environmental conditions can vary significantly from individual to individual in type and exposure time. It is important to reapply moisturiser depending on time since last application, following exercise or swimming or showering, under certain wind conditions, and persistent or changing weather conditions such as dry or humid air, hot or cold temperature ranges. Consideration of all these factors will affect the frequency and strength of moisturiser application as well as in combination with skin type and needs determine the choice of moisturiser. Consumption of water plays a role in skin hydration and so needs to be monitored. Changes in conditions and severity of environmental conditions that might affect skin condition are not always easy to discern and it is not always possible to have the presence of mind to understand that the implications of these changes may need action such as modifying the exposure or reapplication of moisturiser. It is also not known which moisturiser is best for the conditions that you are experiencing, or conditions have changed and another moisturizer may be more appropriate. Sometimes a moisturiser may not be working properly and one more appropriate is required.

To afford the best lifetime protection of human skin, sun exposure can also be minimized by altering habits contributing to exposure. Storage and analysis of sun exposure patterns crossed referenced with user behaviour. The minimization of UV sun exposure, compliance to having sunscreen reapplied, wearing of hat could be linked to rewards or turned into an engaging game to incentives. The provision of information on individual UV exposure in formats such as total time remaining at current sun exposure, or total UV exposure remaining before sun screen re application, along with instantaneous UV exposure would empower people to experimentally learn how they can minimize exposure and given them some more control over their circumstances. Damage from sun exposure is cumulative over one's lifetime. It would be desirable for a user and their health professional to record long periods, or indeed an individual's lifetime's exposure combine with information such as location of exposure and time to enable suggestions to be made about minimizing UV radiation exposure.

An effective campaign can have an enormous impact on public health with regular sunscreen use of SPF 15 or higher up to the age of 18 could decrease the frequency of skin cancer in Australia by as much as 68 percent. The provision of the ability to measure their own personal exposure and so be able to experiment with varying this through changes in the activity time they spend in the time and to be able to do so through engaging technology and visual display such as smart phone, mobile computing device, and tablets could achieve perhaps the most effective defense against destructive sun exposure, education. Further styling of the management of sun exposure are a game format of interaction through gamification including rewards as one example would also achieve these goals such as reapply the sunscreen when the alert is given, wearing a hat or clothing as recorded by the sensor, and staying in the shade as recorded by the sensor or obtain by GPS. A mechanism to tell a user when they have achieved their goal dosage for Vitamin D generation through sun exposure on a daily and weekly basis is desirable. The ability to review this exposure with a health professional may also help in planning lifestyle choices to optimise UV radiation exposure for Vitamin D synthesis.

Exhaust fumes from vehicles and also from industry as well as other air pollution are responsible for many deaths each year. As one example, The World Health Organization has classified diesel exhaust as a carcinogen. Other outside pollutions include CO, Ozone, Sulfur dioxide, Nitrogen Oxides, lead and many others while internal pollutants include CO from heating. Cities have pollution indexes but they are not localized so there is no way to measure and be aware that there may be areas of concentration in specific areas for example, near roads.

In some embodiments, real time UV radiation readings made using a UV sensor measured very close or at the same point as the individual, make the significant local variations and quick changes in exposure measurable. This provides a more accurate UV radiation measurement than only reference to a single city or state wide UV radiation reading which may be distant and therefore unrepresentative of the individual's UV radiation exposure.

In some embodiments, the collection of real time or stored UV radiation values from sensors other than only the individual's for example, on a peer to peer basis from other device located at varying distances from the user as well as collection from other sensors positioned locally as well as in the same local area, city or state by GPS lookup of real time and stored UV sensor values from a central server to which UV radiation readings have been measured and sent by other devices, gives the chance to also collect and apply statistical methods on the set of measurements from this grid of sensors such as averaging, worst case, or distance weighting to provide a measurement value. If accuracy or the priority of the sensor is indicated then it's UV reading may be given a higher consideration in the calculations. If the type of positioning of the sensor is indicated such as on a pram, or by a swimming pool, then factors such as more sensitive skin, in the case of the pram associated with a baby being near the pram or less clothing in the case of the pool may be considered in the calculation of UV radiation protection and skin type.

In some embodiments, devices and mobile devices may automatically connect and collect real time or stored UV radiation values from other mobile devices and UV sensor devices as they move into range of each other.

In some embodiments, UV sensors can via a connection to a mobile device equipped with GPS, or via other such computing device at a know location, have their values reported to server from where other mobile devices at a similar GPS location may request UV radiation values stored on the server for the location and range matching to some extent to the GPS location of the requesting mobile device.

In some embodiments, the UV sensor device is able to function independently to a mobile device, with it's own embedded software instructions controlling the measuring of UV radiation and using parameters such as the UV protection of an associated individual from sun screen SPF and clothing as some examples as well as skin type, activity and other factors to calculate cumulative exposure and determine when the exposure has passed a safe level and generating an alert. In such an embodiment, the mobile device provides a user with a convenient method to specify these parameters via it's rich graphical interface and view resultant measurements. The configuration and retrieval of this information can be achieved by one method using Bluetooth, or Bluetooth low energy, or other lower power rf communications.

In some embodiments, a mobile device may have no UV sensor associated with it but instead consult a remote server to gain a multiplicity of UV sensor values corresponding to it's location based on GPS or other location detection methods.

In some embodiments, the ability to use GPS location of the device or mobile computing device 200 (or such device of the user) to locate environmental information that may indicate the likely behaviour and activity of the person such as most likely swimming because at the swimming pool.

In some embodiments, the ability to use GPS location of the device or mobile computing device 200 (or such device of the user) to locate environmental information that may indicate how reflective the surfaces around a user are and so estimate likely UV radiation reflection to improve the calculation of UV radiation.

In some embodiments, the length of time that sunscreen is effective is affected by how much sweat the user produces. This can be determined by heart rate, using an accelerometer to measure activity or inferring from location activity and then deducing the amount of sweating and predicting how much sooner sun screen should be reapplied.

In some embodiments, the length of time that sunscreen is effective is affected by how much time and the frequency that someone gets in and out of the water this can be calculated by using a conductivity sensor or the like to work out the amount of time spent in the water as well as the movement in and out of the swimming pool. Additionally, in concert with the accelerometer the wear on the sunscreen caused by movement in the water and in this way deduce the amount of sweating and predicting how much sooner sun screen should be reapplied.

In some embodiments, UV reflection can be very significant. The primary variables influencing reflective is the surface that the person is standing on. The reflection can be measure by sensors designed to face downward or by inferring the surface reflectivity from the person's location either manually set or derived from information that associates terrain with location. Vitamin D levels are important for health. The ratio of UVA and UVB is important with too much UVA inhibiting the production and maintenance of Vitamin D. A sufficient amount of UVB exposure is required but the level should not exceed the limit depending on the person here sub urn occurs. This system provides a way in which the user can know if the Vitamin D level has been reached and also to be made aware if the ratio. It may also allow strategy whereby different exposure levels and sunscreen, hat combinations are suggested till Vitamin D level are reached and then a different level of exposure after the level is reached to manage the trade-off between the consideration of the need to avoid being burnt from UVA and UVB and the need for UVB to generate Vitamin D. It can also help to warn when the user is in environments where the UVA:UVB ratio is not conducive for Vitamin D creation. For those primarily wishing to generate Vitamin D from sun exposure this measurement aid can also be a skin cancer saver by allowing users to suspend sun exposure having received the necessary sun exposure for Vitamin D.

In some embodiments, maintaining skin which has a good moisture is an important health and beauty priority for users. This system monitors factors such as humidity, temperature, wind, solar radiation exposure along with the skin characteristics and water consumption to predict when the user should change their environment apply moisturizer or try a different moisturizer.

In some embodiments, natural UV, Visible, infrared as well man made light of all types including blue light and including from processes such as but not limited to welding, can damage eyes and also cause eyes strain if for example they are exposed to strong glare. This system gives a warning if the intensity of the glare exceeds limits or if excessive blue light, which may primarily comes form man made sources. A warning is also given if the eye is exposed to excessive UV, infrared or blue light. UV sensors and other light sensors can be positioned to measure light radiation from the side, top and bottom of the eye where glasses may not provide protection.

In some embodiments, the setup of a device for calculating safe UV exposure with sunscreen settings can be simplified with the creation of a system where sunscreen information such as SPF, expiry date, Water resistance, and ingredients can be quickly acquired by the device by use including scanning of a QR code on the sun protection product or clothing and QR code reader on the smart phone, which can pass if necessary these setup parameters to the a small device perhaps placed as a wristband. QR codes can also be used with a chart to match skin type. The setup of the moisturizer may also be done by QR codes on the moisturizer product. A QR or bar code on the sun protection or clothing may be used to lookup in a database on the mobile device or remotely information such as the SPF, Water resistance and ingredients and expiry date. The QR code can contain all of such information or use a remote lookup to obtain information common all products with specific information only referring to a particular instance of the product such as expiry date stored in the QR code for the instance of the product.

In some embodiments, Sun damage generally takes time to affect the skin causing effects including ageing as well as skin cancer. This system allows the sensor values associating with a user as well as their configuration settings and values calculated to be stored not only on portable devices such as a wristband or smart phone but also on a server system. A complete profile for an individual of their radiation exposure on skin and eyes as well the locations where they received radiation, intensity and length of time as well as their activities and habit relating to radiation exposure can be stored, analyzed and review by the user as well as $3^{rd}$ parties for example physicians.

In some embodiments, Children may not want to wear a hat (or the device sensing) in which case a pressure sensor or accelerometer may be employed to warn when a child takes off a hat (or UV radiation sensor monitoring) at any specified time of day, for example lunch time, or in combination with UV radiation being present. In the case of the pressure sensor or contact switch when the pressure is gone after the user removes the hat then by this trigger alone or in concert with the also sensing a UV radiation level an alert occurs. In the case of the an accelerometer if the acceleration measure corresponds to no movement then by this trigger alone or in concert with also sensing a UV radiation level an alert occurs. An alert may be audible or visual being generated from the hat, or the alert may be sent to a mobile device if in range, or when the phone later comes into range of the device.

An age adjustment is also made for infant, preschool and primary age in calculations to adjust the effective SPF to account for potential more sensitive skin.

Although the system and figures are shown and described with certain components and functionality, other embodiments may include fewer or more components to implement less or more functionality.

FIG. 1 depicts one embodiment of a device that contains a multiplicity of a variable number of sensors, display, input, processor and communication modules. The device casing may come in many different sizes and enclosure designs including various different attachment options to attach to people, cloths, hats, people.

Figure 5:
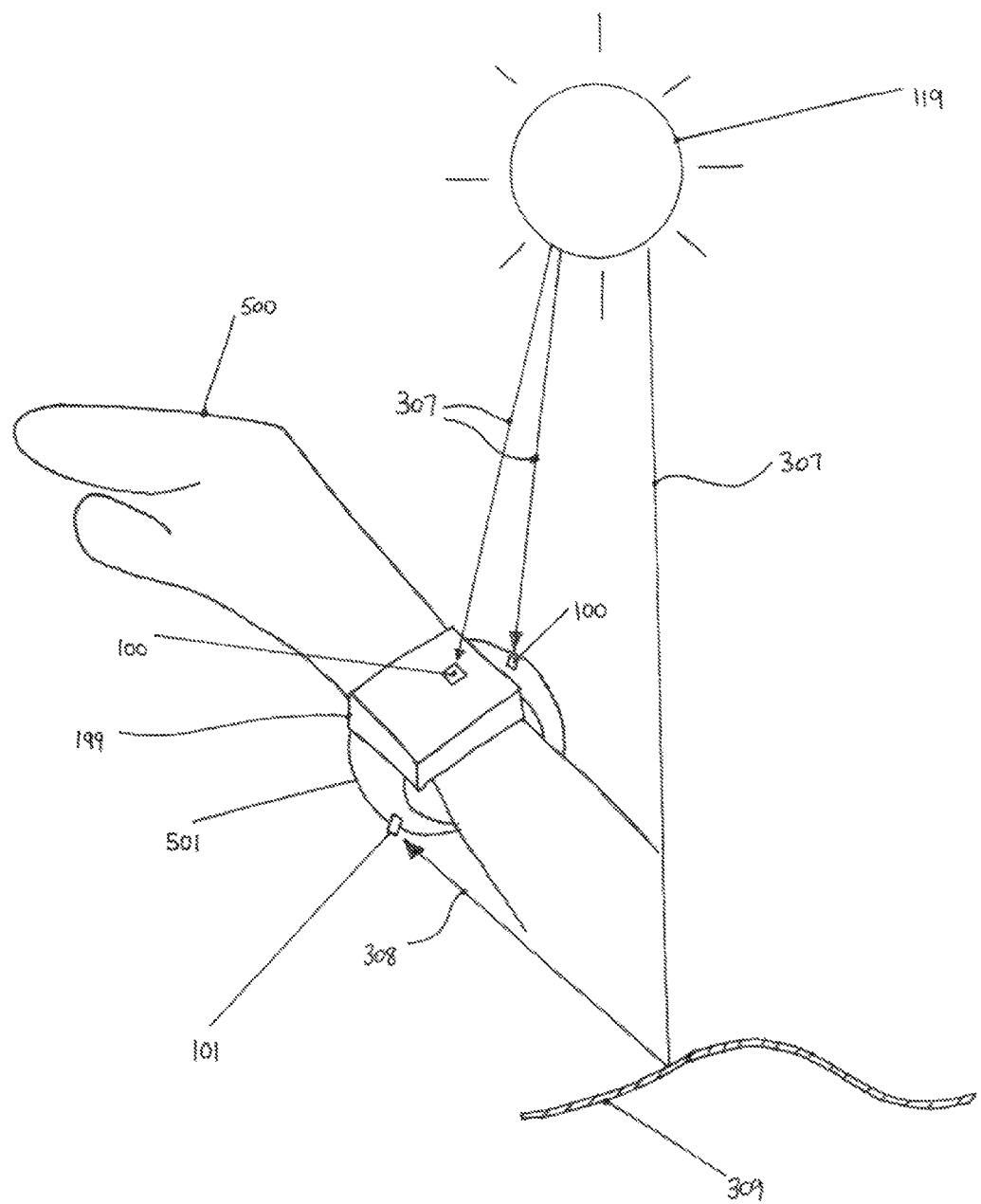
FIG. 5 depicts one embodiment of a user 500 wearing the 199 device, affixed by a wristband 501 with one of more sensors 100 mounted to receive direct UV radiation 307 and one or more 101 sensors 101 to receive reflected UV radiation 308 from reflective surface 309.

One embodiment involves a UV sensor 100 mounted to collect direct UV radiation, a UV sensor 102 mounted to collect reflected radiation, a moisture sensor 103, a temperature sensor 104 located against the body, a accelerometer 108, a altimeter 109, a heart rate sensor 125, a visible light sensor 110 mounted to received direct sun radiation 110, an infrared sensor 127 mounted to received direct sun radiation 127, a blue light sensor 126, a button interface 112, a display area 113, a vibration actuator 114, an air temperature sensor 106, a humidity sensor 107, a pressure sensor 111, a sound generator 115, a processing unit 116, a battery source 117, a attachment device 121 and a antenna 123. A further example configuration of the UV sensor 100 mounted to collect direct UV radiation, and a UV sensor 101 mounted to collect reflected radiation is shown in FIG. 5 involving a wristband.

For reference with FIG. 1, 100—One or more UV sensor(s) able to measure UV (including at least UVA and UVB) or separately UVA or UVB or UVC mounted so that it can pick up direct UV radiation. Optionally fit with lens 124 to increase the likelihood of measuring the greatest magnitude UV radiation level when the sensor is not directly facing the UV radiation source or to act as a filter for a particular wave length band. Several may be needed to make sure that at least one of the sensors is directly pointing towards the UV radiation source. Each measure in mW/cm2.

101—One or more UV sensor(s) able to measure UV (including at least UVA and UVB) or separately UVA or UVB or UVC mounted so that it can pick up reflected UV radiation. Optionally fit with lens 124 to increase the likelihood of measuring the greatest magnitude UV radiation level when the sensor is not directly facing the UV radiation source or to act as a filter for a particular wave length band. Several may be needed to make sure that at least one of the sensors is directly pointing towards the UV radiation source. Each measure mW/cm2.

102—extension port to allow any additional sensor described for 199. Electrical, inferred, optical.

103—moisture sensor able to sense if the device is immersed in water. A simple circuit which can detect the presence of liquid and generate an on signal when present and a off signal when not.

104—body temperature sensor, mounted so that it can sense body temperature. As one example connected on the bottom of the device if the device is worn as a wristband. This can be used to predict perspiration levels. Typically mounted on the under side of the device in contact with the users body.

105—moisture sensor to contribute to the measurement of perspiration using conductivity. Typically mounted on the under side of the device in contact with the users body.

106—air temperature sensor. This can be used to contribute to the prediction of perspiration using conductivity.

107—humidity sensor. This can be used to contribute to the prediction of perspiration. Includes measurement of relative humidity

108—accelerometer. This can be used to predict the amount of movement in x, y, z directions from which predictions of perspiration, movement which may contribute to sun screen wearing off, the wearing or clothing or application of sunscreen or moisturisers.

109—altimeter. This can be used to predict the UV radiation at higher altitudes.

110—visible light sensor. This can be used to determine if device is in sunlight. if the device is in sunlight but no UV sensor is installed, then

111—pressure sensor. This can be used to indicate when the device is being worn. Typically mounted on the under side of the device in contact with the users body.

112—button interface. Functions such as resetting measurement function can be performed using the interface.

113—display area. This may show measurement and setting information and alerts such as for exceeding uv dosage and other events

114—vibration actuator. This may be used to indicate alerts such as for exceeding uv dosage and other events.

115—sound generator. This may be used to indicate alerts such as for exceeding uv dosage and other events.

116—processing unit. This can be used to collect sensor information, perform UV radiation calculations and generate alerts. It contains software instructions to execute all the functions described for the device 199. It also generates the communications for transfer of sensor data using, but not limited to, low power RF conforming to standards such as Bluetooth 4, Bluetooth low energy and Bluetooth. The processing unit may also include an analogue to digital converter to convert sensor values.

117—battery source.

118—solar panel. Power source to augment or replace 117.

119—UV source. Solar radiation or manmade sources.

Figure 2:
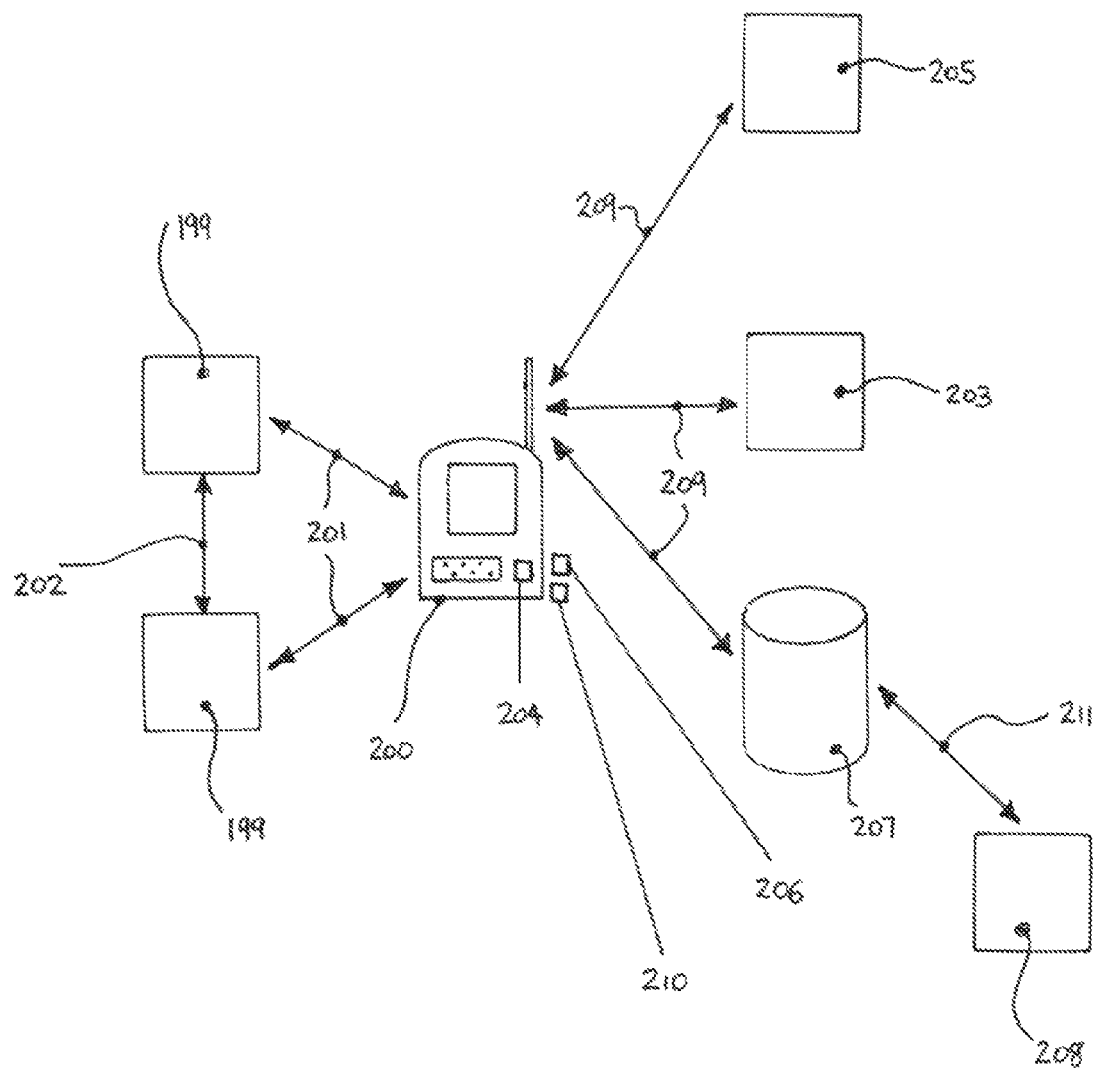
FIG. 2 depicts one embodiment of the possible interconnection topology between the device described in FIG. 1 and other devices such as phones, tablets, computers, internet, using low power wireless networks, Wi-Fi, and wire.

120—UV radiation from 119
121—attachment device. This is used to attach the device to a person or object such as clothes
199—the sensor device consisting elements 100, 101, 102, 103, 104, 105, 106, 107, 108, 109, 110, 111, 112, 113, 114, 115, 116, 117, 118 and 122.
122—communication connector. This allows the connection of optical, intra red or electrical connection to communicate with the processor.
123—antenna for radio communication such as low power RF such as Bluetooth 4 or Bluetooth low energy or Bluetooth.
124—lens on UV and light sensors. Including wide angle or more directional or ability to h
125—heart rate monitor. Typically mounted on the under side of the device in contact with the users body.
126—blue light sensor. Blue light (380-480 nm)
127—infrared sensor
128—capacitor and electrical circuitry to deliver suitable power for the device 199
129—compass FIG. 2 depicts one embodiment of the possible interconnection topology between the device described in FIG. 1 and other devices such as phones, tablets, computers, internet, using low power wireless networks, wifi, and wire. Mobile computing device 200 can communicate with one or more 199 devices via 201. One or more 199 devices can communicate peer to peer with each other. Sensor information can, be passed between one or more 199 devices and one or more mobile computing devices 200 and then the data can be sent and received from 203, 205, 207 and 208. Processing of data from 207 can be performed by 208.

Software inside the processing unit 116 controls the acquisition of sensor measurements, the calculation of UV radiation data, display and alerting to user(s) and storage of UV data for analysis. In another embodiment, the application 204 could perform the calculation in for example, a mobile computing device 200. The software calculation of UV radiation data is not only dependent on the sensor readings but also a wide range of settings and readings detailed as follows, not all of which may be used in the calculation. The software monitors and displays the instantaneous values of UV radiation. It also takes the user's skin type, UV radiation levels, sunscreen properties and environmental factors and time into account to calculate the time remaining before re application on sunscreen is required. It also shows the cumulative UV exposure, cumulative over exposure (which is when there is no longer any protection) as well as cumulative skin damage. Vitamin D generation by the body requires UVB. The software calculates the amount of Vitamin D produced. This is helpful in also helping to determine when adequate sun exposure has been received. For those primarily wishing to generate Vitamin D from sun exposure this measurement aid can also be a skin cancer saver by allowing users to then suspend sun exposure having received the necessary sun exposure for Vitamin D generation. The system also warns the user when they are not on track to achieve enough Vitamin D exposure in a week. The software takes the user's skin type, UV radiation levels, moisturizer properties and environmental factors and time into account to calculate the time remaining before re application on moisturizer is necessary to preserve skin moisture.

Figure 3:
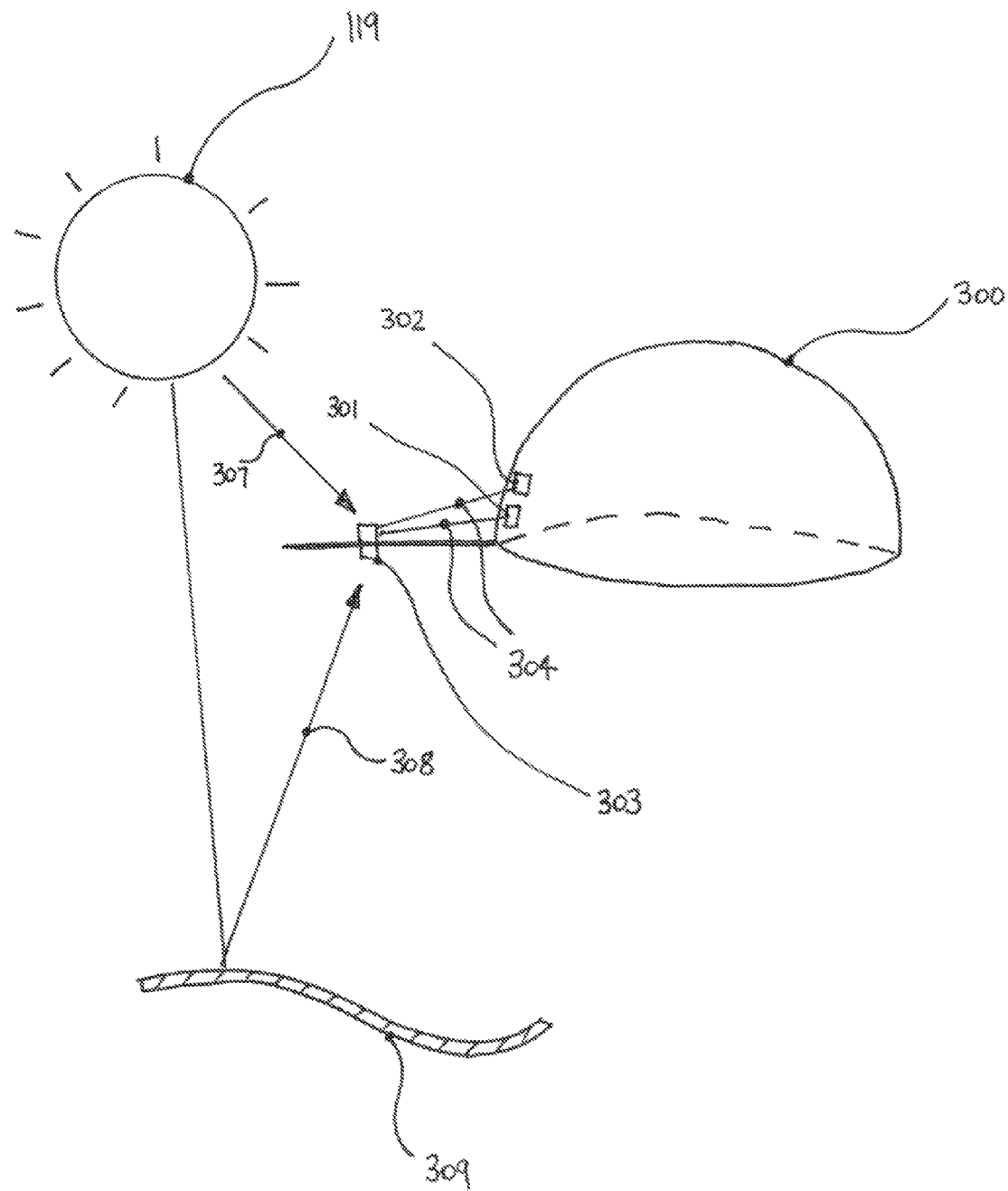
FIG. 3 depicts one embodiment of a hat which is mounted with two sensors to detect whether the hat is being worn by 301 contact switch or pressure switch 302. Device 303 embedded in the hat with surfaces on the top and bottom sides to measure direct UV radiation 307 and reflected UV radiation 308 from surface 309. Wires or a radio connection exist between 301, 302 and 304. Device 303 also contains.

For reference, 200—mobile computing device such as Smart Phone or Tablet or computer, consisting of a processor, display, input such as keyboard, touch screen, with wireless, such as low power Bluetooth (blue tooth 4 or Ble or Bluetooth Low Energy), bluetooth (c), wifi, internet and supporting mobile device wireless communication protocols including but not limited to 3G or 4G. GPS and camera. Example of such devices including but not limited to Phone, Tablet, computer, smart devices and including Mobile devices running operating systems such as iOS and Android with Bluetooth 4 (blue tooth low energy) support. Devices which support the display of information on the inside of glasses such as Google Glass and similar products.
201—network with low power RF, bluetooth (blue tooth 4 or Ble or Bluetooth Low Energy) or bluetooth (c) between mobile computing device 200 and sensor device 199.
202—network with low power RF, bluetooth (blue tooth 4 or Ble or Bluetooth Low Energy) or Bluetooth (c) between two or more peer UV radiation sensing devices 199 and 199.
203—a device 199 geographically fixed local within 2-5 kms internet connected device with measurement sensors as described for device 199.
204—software instructions, for example as a smartphone APP which can communicate with Bluetooth, Bluetooth 4 or BLE or Bluetooth low energy or other low power RF or wifi or internet protocols, 3G, 4G. Including software instructions running on operating Systems, iOS and Android using Bluetooth 4 (blue tooth low energy) support.
205—a device 199 geographically fixed located within a city distance of 40-200 kms, internet connected device with measurement sensors as described for device 199
206—camera used for QR.
207—database for storing sensor data including from 199, alert, settings for device 199 and mobile computing device 200 and other data such as product information including barcode, ingredients, expiry dates for batches, product advantages and disadvantages.
208—processing unit. Capable to processing alert users based on events and data mining intelligence. Capable to identify usage patterns including but not limited to for UV radiation, Blue Light, Vitamin D, and Cosmetics usage
209—Data connection including, but not limited to internet, wifi, low powered Bluetooth (blue tooth 4 or Ble or Bluetooth Low Energy), bluetooth, cable, Mobile Device communication protocols including but not limited to 3G or 4G.
210—GPS
211—Sensor Data and processing results FIG. 3 depicts one embodiment of a hat which is mounted with two sensors to detect whether the hat is being worn by 301 contact switch or pressure switch 302. Device 303 embedded in the hat with surfaces on the top and bottom sides to measure direct UV radiation 307 and reflected UV radiation 308 from surface 309. Wires or a radio connection exist between 301, 302 and 304. Device 303 also contains. An example configuration of a device 303 which consists of the device 199 including the UV sensor 100 mounted to collect direct UV radiation, and a UV sensor 101 mounted to collect reflected radiation is shown in FIG. 3 involving a hat. In FIG. 3, an Accelerator in 303 or pressure sensor 302 or contact switch 301 can sense when the device or hat is being warn, this may be helpful to know when results should not be counted as cumulative exposure because the user has taken off the device. As one example, if the device has been taken off and left in the sun.

Referring to FIG. 3, a further example includes the configuration of the device 199 mounted with the UV sensor 100 mounted to collect direct UV radiation 307, and a UV sensor 101 mounted to collect UV reflected radiation 308 located in hat brim 303 positioned on the part of the hat where direct and reflected radiation can separately be collected. Wires or a radio connection exist between 301, 302 and 304.

Compliance of children in wearing a hat can be measured. Referring to FIG. 3, pressure and/or touch sensors 303 and 304 placed in the hat recorded if the hat is being warn. The accelerometer 108 in 303 can also be used to indicate if the hat is on by the user's movement. When the measured UV level reaches a threshold as measured by 303 or by a another sensor in the system indicated by another other device 199 (including also a device fitted to the same user), 203, 205 or 208 as examples, or when it has been configured that a child must not remove a hat or it is the critical time of day when the UV level will be stronger, then an alert is generated on the hat by the device 303 or a mobile computing device 200 or sent via the internet to another device where a supervisor can be notified when the child is not wearing the hat as indicated by sensors 303, 304 or 108 in 303. Alternatively information including the time of day, date, UV level and whether the hat was being worn is stored for later retrieval via mobile computing device 200. The alert can be configured to be activated when nearby sensors indicate that UV has reached a certain level. In this way, a teacher in a playground could be alerted if a child is not wearing a hat, or data about children used to measure overall compliance to wearing a hat at correct times. Alternatively parents could retrieve data stored in 303 or sent at the time of measurement and stored on other devices. For reference, 300—hat. Any type of hat where the sensors can be placed facing both up and down to measure direct and reflected UV respectively 301—contact switch. used to indicate if the hat is being warned.

302—pressure sensor. Used to indicate if the hat is being warned.

303—one 199 device mounted into the hat with one sensor used to measure UV direct radiation 308 reflected from 309 using two or more sensors. Including an accelerometer.

304—wire or radio connection between elements

307—UV radiation composed of UVA and UVB from 119

308—UV radiation composed of UVA and UVB from 119 where some percentage is reflected 309—Reflective surface.

Figure 4:
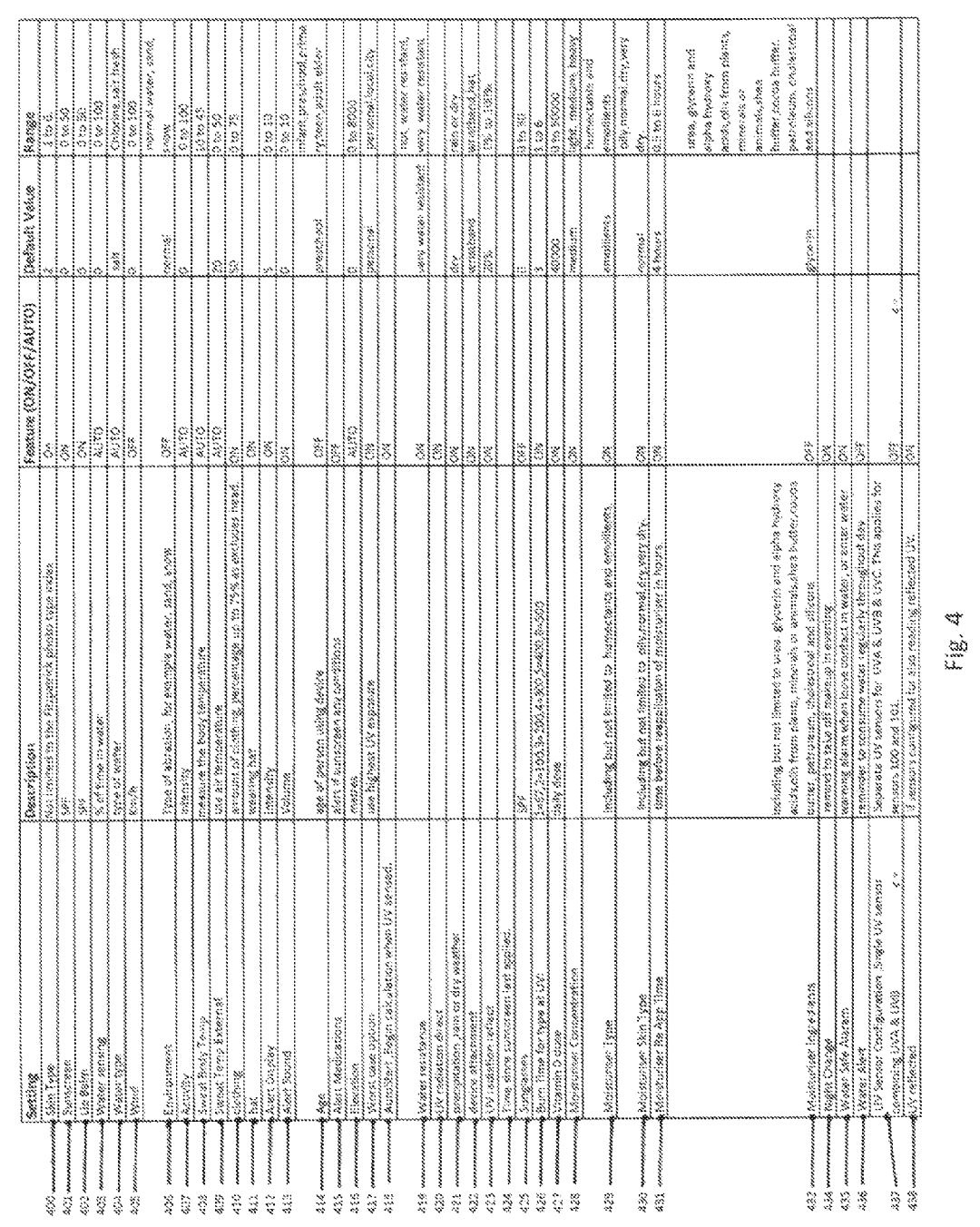

FIG. 4 depicts one embodiment of a table of configuration parameters. In the description of FIG. 4, Features "ON" indicates the feature is On by default and may be used in the calculation. It will use the value set for this value. In the description of FIG. 4, Features "OFF", indicates the features in off by default and may need to be turned on before it will be used in the calculation. In the description of FIG. 4, Features "AUTO" indicates the feature will try to automatically determine the value from sensors or values from the internet.

400 Skin Type—not limited to the Fitzpatrick photo type index, Feature: On, Default: 2, Range: 1 to 6.
401 Sunscreen—SPF, Feature: ON, Default: 0, Range: 0-50.
402 Lip Balm—SPF, Feature: ON, Default: 0, Range: 0-50.
403 Water sensing—% of time in water, Feature: AUTO, Default: 0, Range: 0-50.
404 Water type—type of water, Feature: AUTO, Fresh, Chlorine, Salt Default: Salt.
405 Wind—Km/h, Feature: OFF, Default: 0, Range: 0-100.
406 Environment—type of abrasion, water sand, snow, normal, Feature OFF, Default: normal.
407 Activity—intensity, Feature: AUTO, Default: 0, Range 0-100.
408 Sweat Body Temp—measure the body temperature Feature: AUTO.
409 Sweat Temp External—use air temperature, Feature: AUTO, Default: 20, Range: 0-50.
410 clothing—amount of clothing—percentage up to 75% as excludes head.
411 hat—earring hat—Feature: ON. Feature
412 Alert Display—Intensity, Feature: ON, Default 5, Range 0-10.
413 Alert Sound—Volume, Feature: OFF, Default: 0, Range 0-10.
414 Age—age of person using device, Feature: OFF, Default: preschool, Range: infant, preschool, primary, teen, adult, elder.
415 Alert Medications—alert if sunscreen any conditions.
416 Elevation—meters, Feature: AUTO, Default: 0, Range: 0-8000.
417 Worst case option—use highest UV exposure, personal, local, city, Feature: ON, Default: Personal.
418 AutoStart—Begin calculation when UV sensed. Feature: ON.
419 Water resistance—Feature: ON, water resistant, very water resistant, not water resistant.
420 UV radiation direct—Feature AUTO.
421 precipitation—rain or dry weather FEATURE ON.
422 device attachment—wristband, hat.
423 UV radiation reflect—Feature AUTO, percentage 0-100%, Default 20%.
424 Time since sunscreen last applied.
425 Sunglasses—SPF, Feature: ON, Default: 0, Range: 0-50.
426 Burn Time for type at UVI of 1—1=67, 2=100, 3=200, 4=300, 5=400, 6=500.
427 Vitamin D dose—0 to 50,000 IU.
428 Moisturiser Concentration—Including but not limited to, medium, heavy.
429 Moisturiser Type—Including but not limited to, humectants and emollients.
430 Moisturiser Skin Type—Including but not limited to oily, normal, dry, very dry.
431 Moisturiser Re App Time—time before re application of moisturiser in hours. 4 hours may be an initial setting.
432 Moisturiser Ingredients—Including but not limited to: Urea, glycerin and alpha hydroxy acids, oils from plants, minerals or animals, shea butter, cocoa butter, petrolatum, cholesterol and silicones, etc.
434 Night Change—remind to take off makeup in evening FEATURE ON.
435 Water Safe Alarm—is a warning system.
436 Water Alert—reminder to consume water regularly throughout day FEATURE ON.
437 UV Sensor Configuration—Single UV sensor combining UVA & UVB, Separate UV sensors for UVA & UVB & UVC. This applies for sensors 100 and 101.
438 UV Reflected—ON, if sensors configured for also reading reflected UV.

In one embodiment, the device begins functioning according to the autostart 418 feature, if the autostart feature is ON then the as soon as the device begins to sense UV radiation for a consistent period then it begins to measure UV radiation and alert when levels are exceeded. On a daily basis it will reset measurement. When autostart is not enabled then it will require user input 112 to begin measuring UV radiation. After the device begins recording UV then it will continually measure until an alert occurs corresponding to the need to re apply sun screen or stop being exposed to the sun. In addition to alerts a continual cumulative total and instantaneous measurements may be displayed for all properties being measured. For moisturizer reapplication measurement may begin after the user indicates by user input 112 that the moisturizer has been applied. Alternatively, the device can also continually measure UV even when the alert has been generated. Referring to FIG. 2, the user can alter all of the setting by connection to a mobile computing device 200 such as a smart phone, tablet or computer. An application 204 on such a device allows the user to change these settings. The user may enter values to customize all the features in FIG. 4, through a user interface in application 204 on a mobile computing device 200 such as a smartphone. For the features 401, 402, 410, 411, 419, 425, 428, 432 the user can customize values through a user interface in application 204 on a mobile computing device 200 such as a smart phone but additionally via a QR code reader in application 205 or by selecting a photo or skin picture from the application that corresponds to the skin type in the case of 400 Skin Type, this achieved by scanning a QR code 601 corresponding to skin types 602 to 607 on a skin chart 699. Six skin types are shown corresponding to a skin type index such as the Fitzpatrick photo type index. As an alternative the skin type selection could be done through an application on mobile computing device 200. The QR code 600 should be designed to provide this information.

In the case of Sunscreen 401 and Lip Balm 402 the SPF can be set by scanning a QR code 701 using camera 207 from which information can retrieved from a database about SPF and water resistance for a sunscreen product 700 and the settings for 419 water resistance. As an alternative the Sunscreen 401 and Lip Balm 402 the SPF selection could be done through an application 204 on Mobile Computing Device 200. In a similar manner a QR codes can be read to configure moisturizer settings 428, 429 and 432. At the point of selection, if a QR code is read then the expiry date is checked and the user is alerted if the product is out of date and so will may not provide sufficient protection. A check may also be made against the user's previous usages patterns from 207, 208 or settings such as age to see if the product is appropriate. A questionnaire asking the user about their health, age, allergies etc may also be used at the point of scanning to request more information to help with a decision based on the sunscreen properties indicated from the QR code or information looked up on a remote server via the internet using the QR code. The product information and expiry can be retrieved from 207 or other databases on the internet. The QR code 701 must be designed to provide information including SPF and water resistance and expiry age of product and ingredients. In the case of 410 clothing and 411 hat, the SPF can be set by scanning a QR code 703 from which information can retrieved from a database about SPF. The QR code 703 must be designed to provide this information.

For the feature attributes 403, 404, 407, 408, 409, 416 can be set to AUTO in which case if there is a sensor is installed in the device 199 then this value will be used. Setting the Feature attribute to ON will allow manual entry via the application 204 on Mobile Computing Device 200. In order to calculate water sensing 403 using the 103 moisture sensor when Feature is set to AUTO, periodic sampling is made of the water sensor, if the sensor measuring conductivity finds water across terminals then this time is summed and a percentage by taking water sensed time and dividing it by the total time.

In order to determine 407 the level of activity accelerometer 108 can be employed when Feature is set to AUTO. The processor samples and counts the number of swings in acceleration in any axis over a configurable threshold set initially as +/−1 g for a configurable set time period from 1 to 10 s initially set to 6 s. A second configurable number determines the number of count sample to be averaged in order to arrive at a final averaged count number initially set to 10. This count number is then used to determine if the activity is normal or high level of activity. The averaged count number greater than say 500 then the level of activity 407 is set to high otherwise it is set to normal. Sweat Body Temp 408 is the body temperature measured from a sensor resting the skin it is determine from sensor 104 when Feature is set to AUTO. Elevation 416 is determined from altimeter 109 when Feature is set to AUTO. Sweat Temp External 409 measures air temperature using sensor 106 when Feature is set to AUTO. If the device 199 has no direct sensor to determine Wind 405 and Environment 406 via sensory input these can be determined be set automatically if the device 199 can connect to for example a Mobile Computing Device 200 fitted with a GPS and use internet connection 204 providing the GPS location to 203 retrieve data such as local wind settings at regular intervals. This value can then be update to the device 199. Additionally such a Mobile Computing Device 200 can also provide GPS location to a database using internet 204 to lookup terrain for a location to provide a setting for 406 on the device 199. This can be updated regularly. Additionally such a Mobile Computing Device 200 can also provide GPS location to database using 204 internet to lookup rainfall for a location to provide a setting for 421 on the device 199. This can be updated regularly. Rainfall affects the reflection of all type of terrain sometimes significantly increasing the uv radiation reflection.

In order to measure the reflected UV radiation, the Mobile Computing Device 200 such as a smart phone passes it's GPS position to a database on the device or internet where a lookup from this location can be made to discover the terrain such as sand, grass at the current position of sensing and also other weather condition such as water, snow. According to the terrain and weather type, a percentage for the amount of reflected UV compared to direct uv is given. The UV radiation reflection can then be calculated by multiplying the UV direct radiation by this ratio. For example, the snow may reflect up to 80% of the direct radiation. So the UV reflected radiation is 80% of UV direct radiation. In another example grass has an approximate 15% reflection ratio but when wet this increased to 30% The GPS lookup could also identify Locations such as swimming pools and store typical values of reflectivity and even activity and hence sweating and lotion wear associated with this location. UV levels for locations and times measured by 199 devices can also be uploaded to this database to share with other users where they have devices with no sensors. The ratios of direct and reflected UV measured from the 199 devices sensors can also be used by other users.

Using the data 207 and processing algorithms on 208, 200, 204, data collected over a period of time from sensors on 199, 200 and other sources such as weather information via internet such as government sites, as well as user input on the condition of their skin such as dryness, irritation, excessive oils as some examples, as well as product information such as cosmetics, moistures, sunscreens, lip balms, supplements and medicines. The processing unit 208, or 200, 204, 199 may return to the user through devices 199, 200 alerts and information about types of products such as cosmetics, moisturizers, sunscreens, lip balms, and medicines and times of application as well as environments to avoid. Devices and software on those device including 200, 204, 199 may also present questions to the user and receive responses through 112, 113 or 204. This responses may be used to refine algorithms such as reduce reapplication times if the user reports skin dryness.

Figure 9:
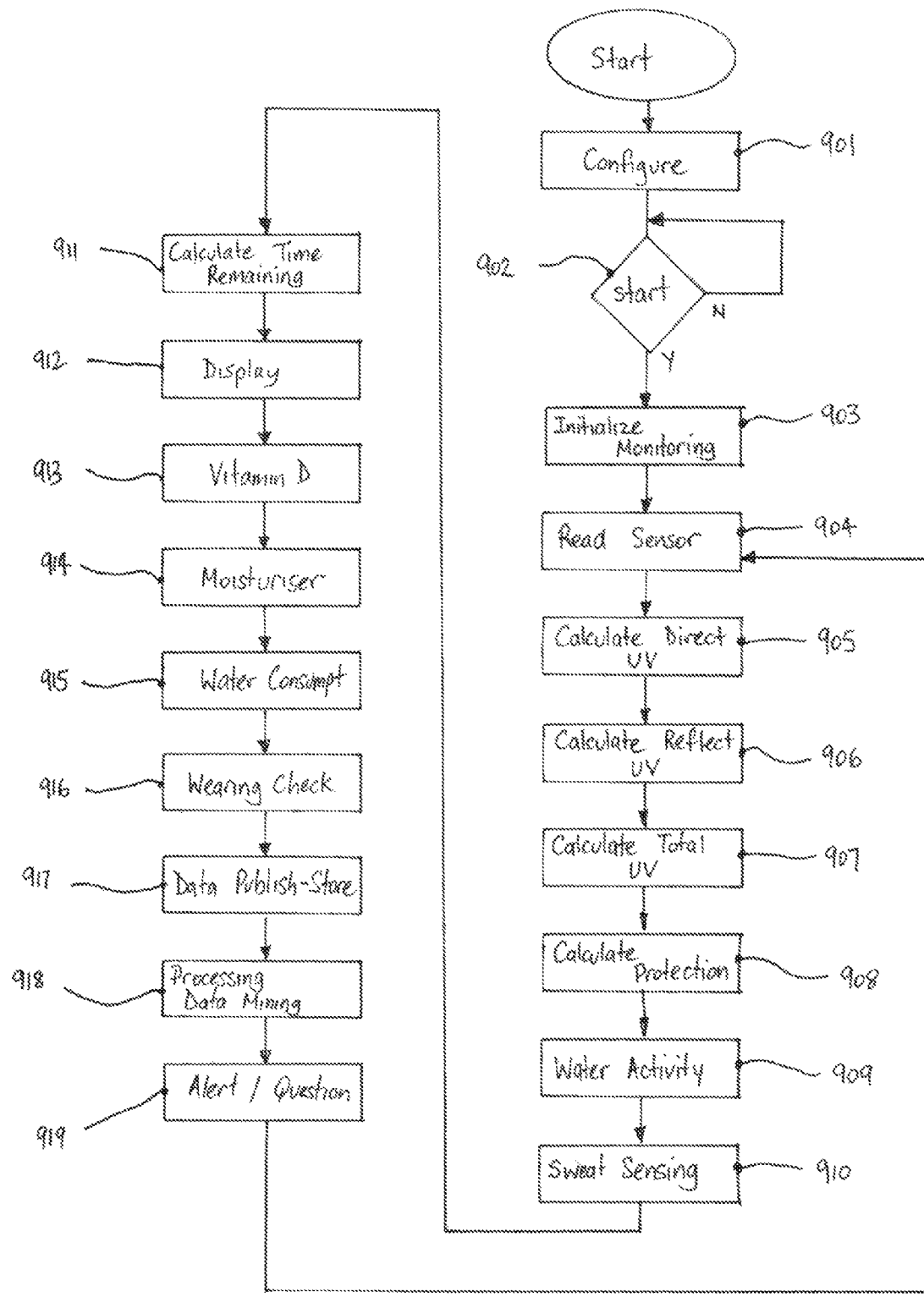
FIG. 9 depicts one embodiment of a flow chart of the sensor reading, processing, calculation, display and logging cycle of the system.

The process for measuring, calculating and alerting, and reporting outcomes can be carried out by software on the portable device 199 or a device such as a Mobile Computing Device 200 as well as devices attached by the internet or wifi such as 207 and 208. Referring to FIG. 1, if any of the sensors are not available on the device 199 or 200, or additional sensor telemetry is required, then other sensor values may be obtain using 204 from 203, 205, 207, 208 or other servers with available sensor readings. If GPS indicates that the device is inside a build then the calculation can account for this by ignoring any sensor values. FIG. 9 shows the main steps. The calculations are repeated a regular timer intervals depending on the value being checked.

FIG. 5 depicts one embodiment of a user 500 wearing the 199 device, affixed by a wristband 501 with one of more sensors 100 mounted to receive direct UV radiation 307 and one or more sensors 101 to receive reflected UV radiation 308 from reflective surface 309. When the user is wearing this configuration with one or more sensors collecting both the direct and indirect radiation continuously or periodically then average and maximum UV values for direct and indirect radiation can be collected. As the user moves his wrist and hand around then an overall highest UV radiation reading can be found as this assumed to be the maximum overall value. This maximum can be obtained over all values whether direct or indirect or separate values measured for the direct and indirect sensors.

Figure 6:
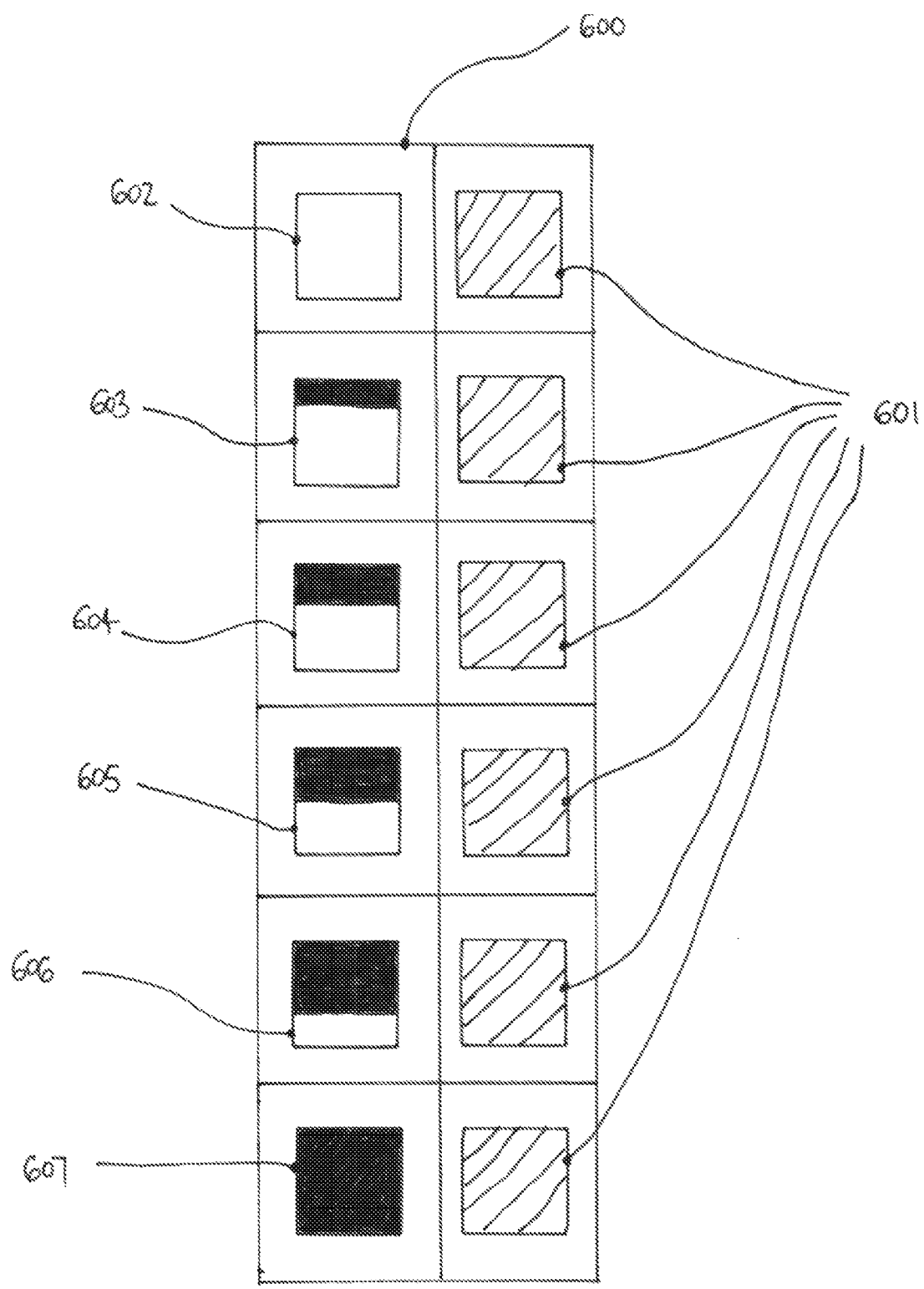
FIG. 6 depicts one embodiment of a skin type selection where different skin types 602 to 607 have corresponding QR codes 601 to represent each type of skin.
Figure 7:
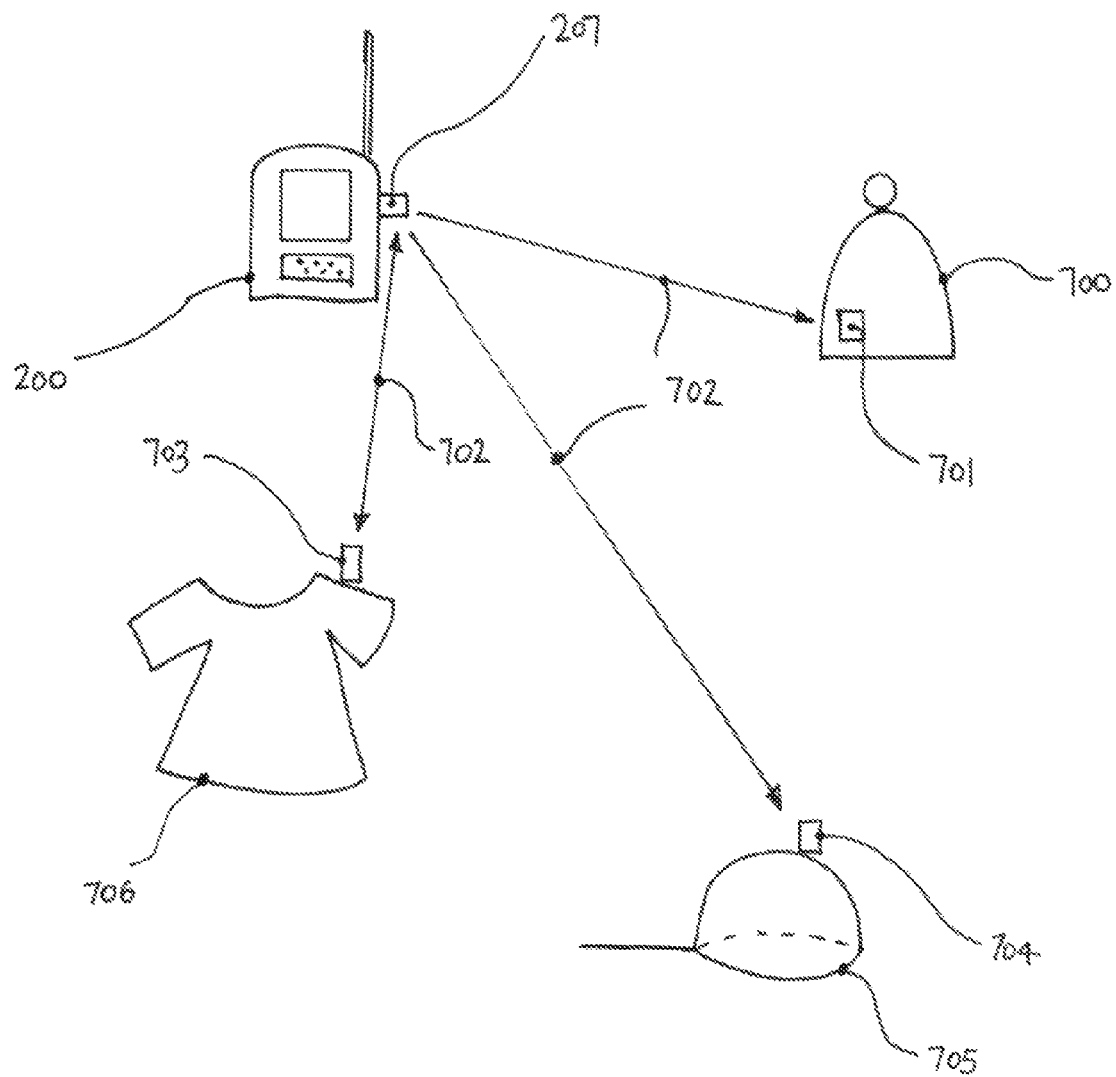
FIG. 7 depicts one embodiment of the elements involved in the scanning 702 of sunscreen bottle 700 with QR codes 701 by the device's 207 camera. It also depicts the scanning 702 of a hat 705 with QR codes 704 by the device's 207 camera and the scanning 702 of clothing 706 with QR codes 703 by the device's 207 camera. As an alternative to QR codes a barcode (GTIN) reading software using a camera on a mobile computing device 200 could also be employed to read the barcode and then 200 could look up a barcode database. Moisturizer type 429 and Moisturizer ingredients 432 and Moisturizer concentration 428 may also be setup in a similar way using QR codes read from a moisturizer bottle.

FIG. 6 depicts one embodiment of a skin type selection where different skin types 602 to 607 have corresponding QR codes 601 to represent each type of skin. 600—skin type and corresponding QR chart. 601—QR codes corresponding to skin types. 602—Skin Type 1 such as form Fitzpatrick Phototype Scale. 603—Skin Type 2 such as form Fitzpatrick Phototype Scale. 604—Skin Type 3 such as form Fitzpatrick Phototype Scale. 605—Skin Type 4 such as form Fitzpatrick Phototype Scale. 606—Skin Type 5 such as form Fitzpatrick Phototype Scale. 607—Skin Type 6 such as form Fitzpatrick Phototype Scale FIG. 7 depicts one embodiment of the elements involved in the scanning 702 of sunscreen bottle 700 with QR codes 701 by the mobile computing device's 200 camera 207. It also depicts the scanning 702 of a hat 705 with QR codes 704 by the device's 207 camera and the scanning 702 of clothing 706 with QR codes 703 by the device's 207 camera. As an alternative to QR codes a barcode (GTIN) reading software using a camera on a device 200 could also be employed to read the barcode and then 200 could look up a barcode database. Moisturizer type 429 and Moisturizer ingredients 432 and Moisturizer concentration 428 may also be setup in a similar way using QR codes read from a moisturizer bottle. The QR code can be linked to information about sunscreen SPF, water resistance, expiry date, and sunscreen and moisturising ingredients which the scanning process communicates to the mobile computing device 200.

Figure 8A:
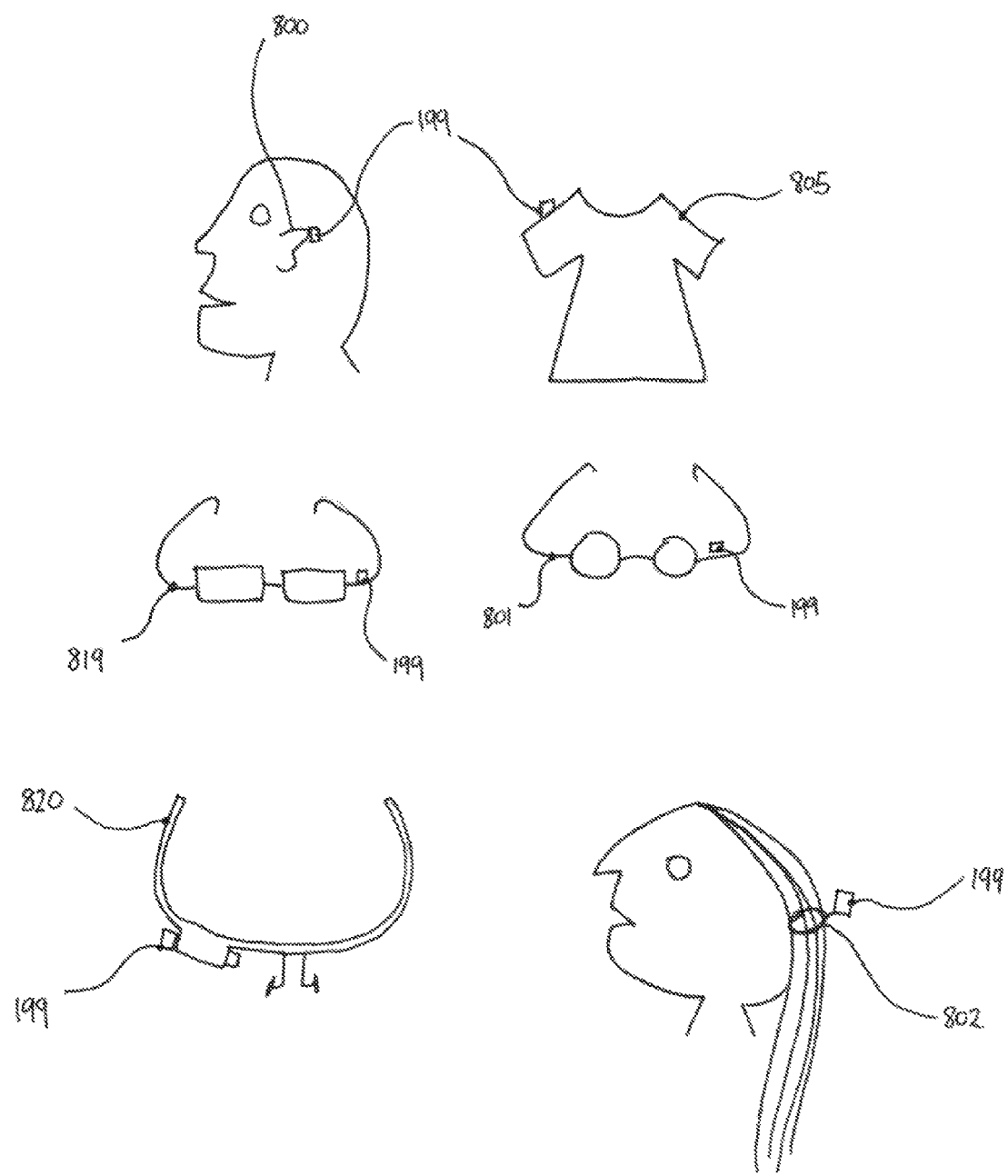
FIG. 8A depicts one embodiment of some possible positions where the device 199 may be placed.

FIG. 8A depicts embodiments of some possible locations where the device 199 may be placed. FIG. 8A contains examples of different manners in which the sensor device 199, may be arranged. Sensor device 199 may be placed on an ear 800. Sensor device 199 may be located glasses or sunglasses 801. The device 199 or sensors from 199 may be placed on or behind the lens. Sensor device 199 may be located on a hairclip 802. Sensor device 199 may be located on a shirt 805. Sensor device 199 may be located on surgeon or dentist goggles 819. Sensor device 199 may be located on electronic glasses such as Google Glass and similar products 820.

Figure 8B:
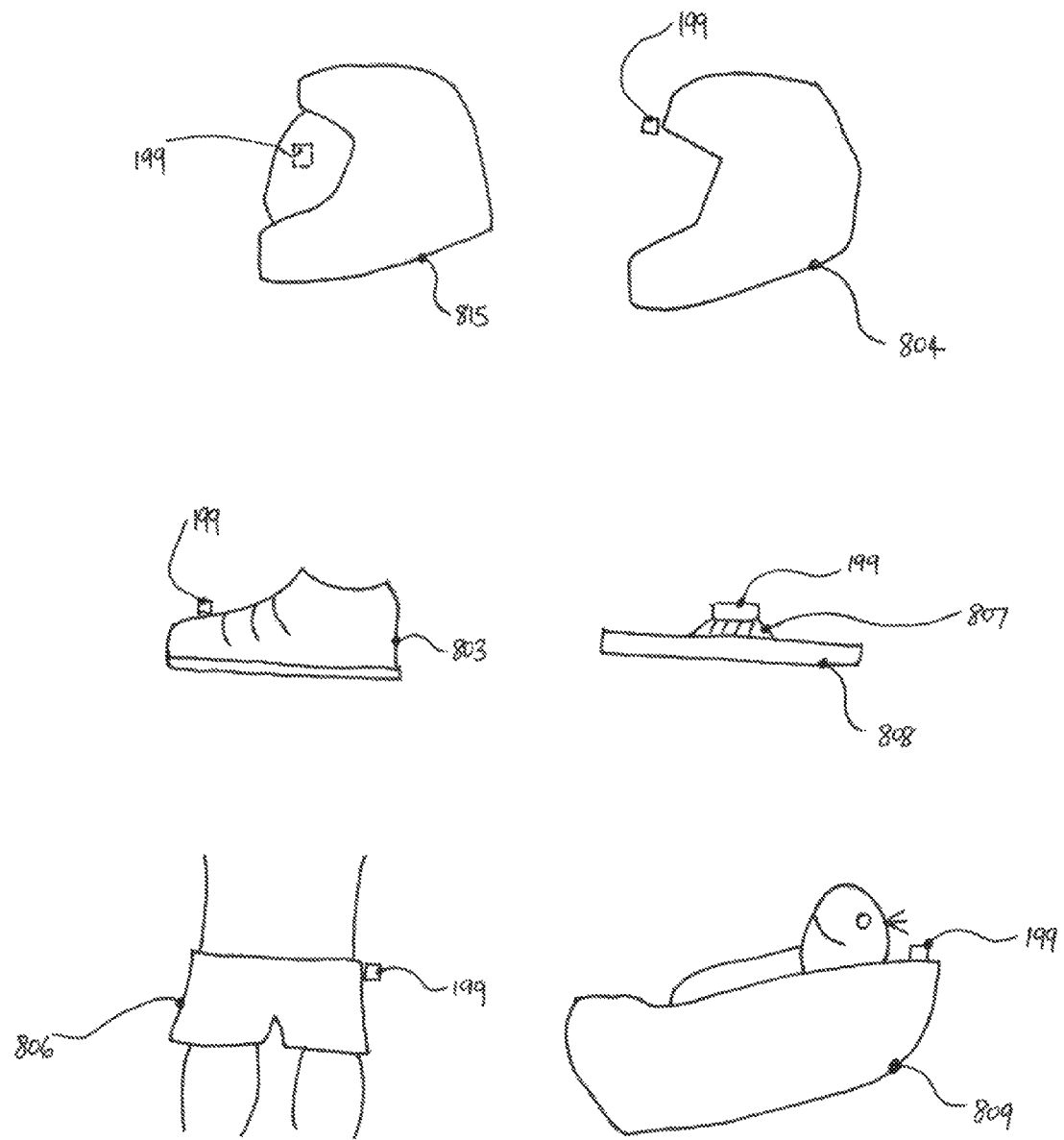
FIG. 8B depicts one embodiment of some possible positions where the device 199 may be placed.

FIG. 8B depicts embodiments of some possible locations where the device 199 may be placed. FIG. 8B contains examples of different manners in which the sensor device 199, may be arranged. Sensor device 199 may be located on a shoe 803. Sensor device 199 may be located on a helmet 804. Sensor device 199 may be located on long or short pants 806. Sensor device 199 may be located on a stand 807 resting on a surface 808. Sensor device 199 may be located on a baby capsule 809 or pram or stroller. Sensor device 199 may be located on a welding helmet 815 inside and, or outside of the visor.

Figure 8C:
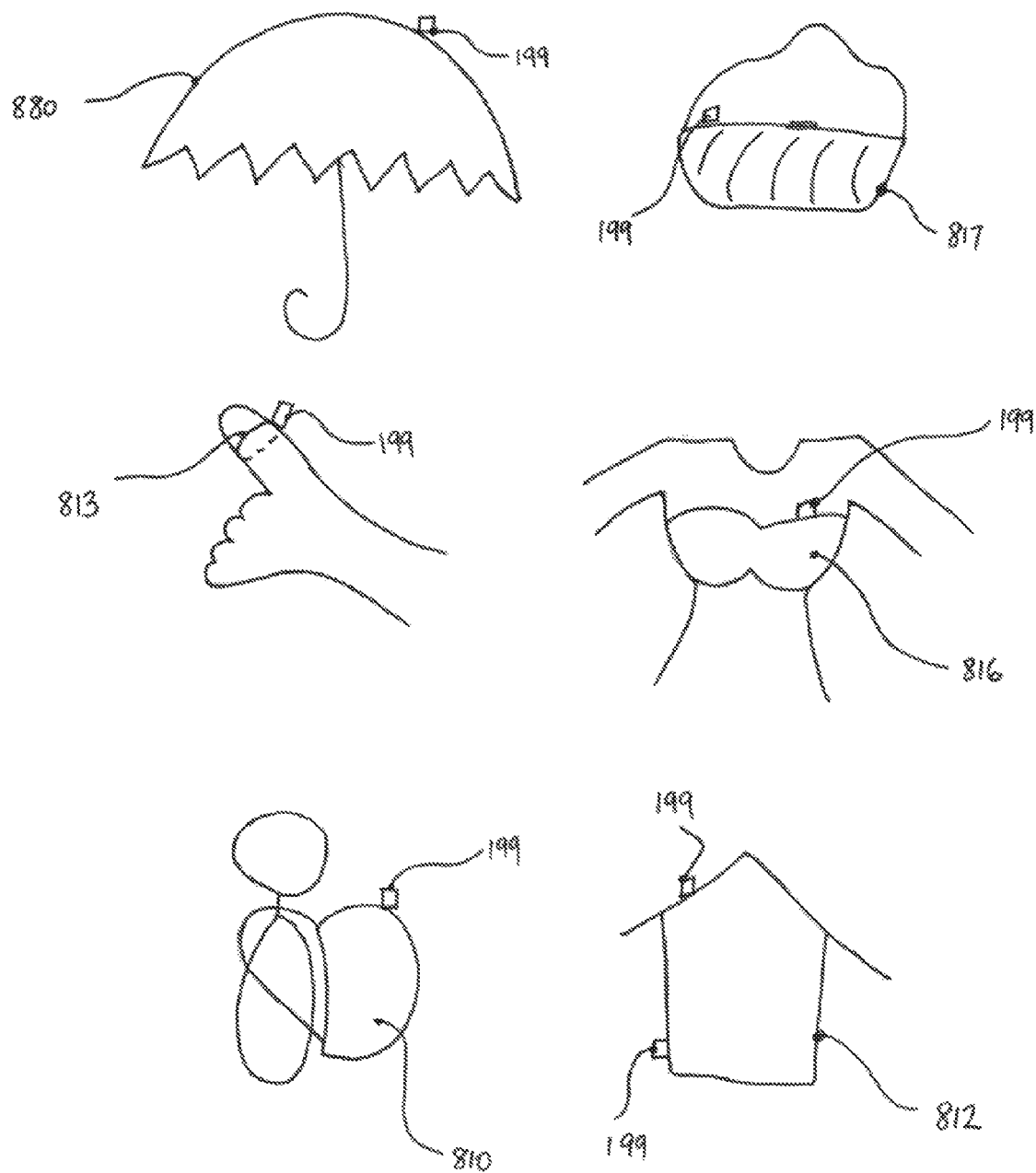
FIG. 8C depicts one embodiment of some possible positions where the device 199 may be placed.
Figure 8B:
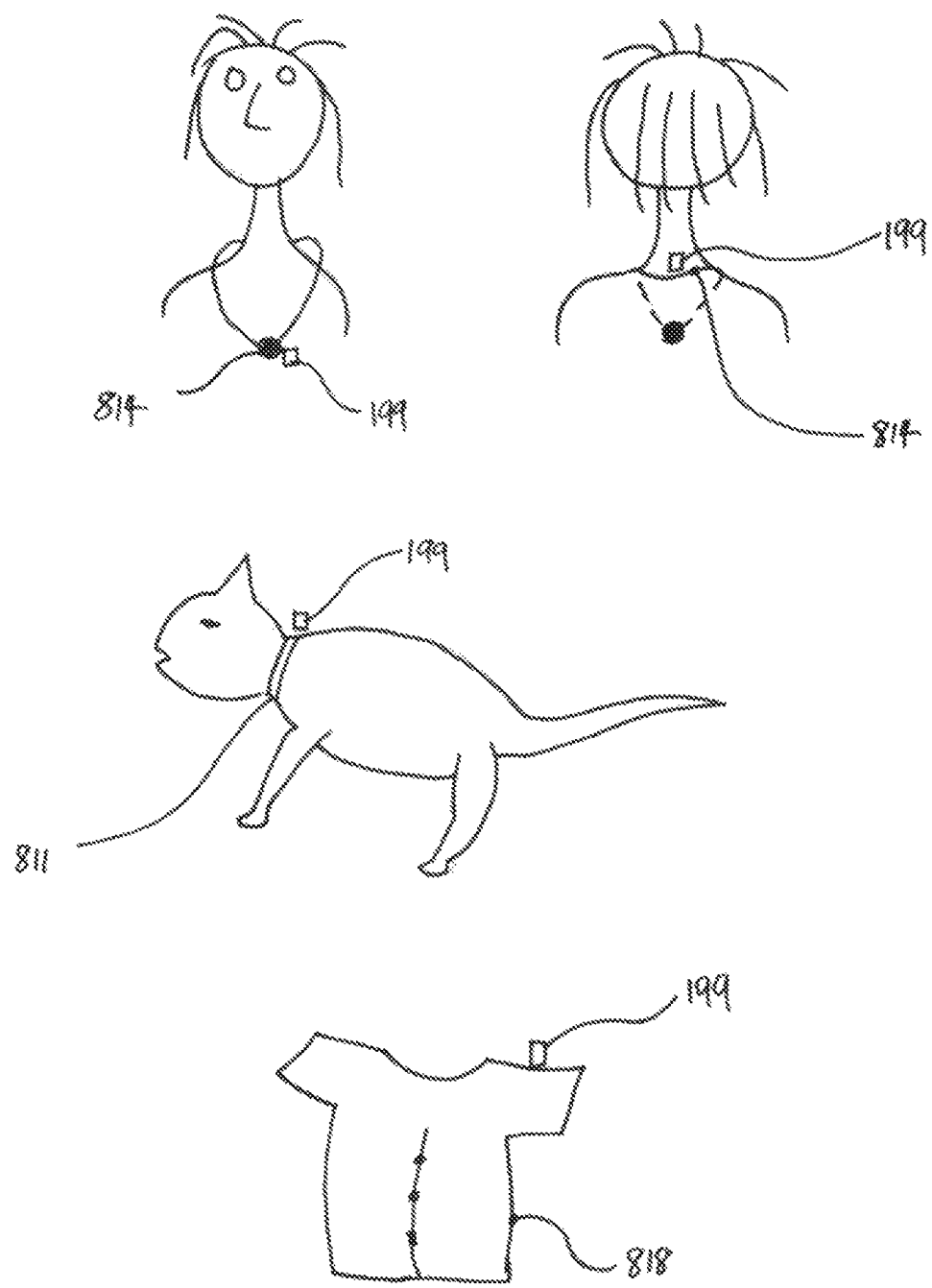

FIG. 8C depicts embodiments of some possible locations where the device 199 may be placed. FIG. 8C contains examples of different manners in which the sensor device 199, may be arranged. Sensor device 199 may be located on a backpack 810. Sensor device 199 may be located on a building structure 812 or boat or other manmade objects. Sensor device 199 may be located on a ring 813. Sensor device 199 may be located on a swimsuit 816. Sensor device 199 may be located on a hand bag 817. Sensor device 199 may be located on an umbrella 808.

FIG. 8D depicts embodiments of some possible locations where the device 199 may be placed. FIG. 8D contains examples of different manners in which the sensor device 199, may be arranged. Sensor device 199 may be located on a dog or cat collar 811. Sensor device 199 may be located on a bracelet 814 or the bracelet strap at the back of the neck. Sensor device 199 may be located on surgeon or dentist clothing 818. ccc FIG. 9 depicts one embodiment of a flow chart of the sensor reading, processing, calculation, display and logging cycle of the system. FIG. 9 contains a flow chart describing the main steps in the process for measuring, calculating, alerting, and reporting outcomes.

At 901, settings are configured. These settings from FIG. 4 can be associated with a person, family, a generic profile for say a child or specific for a device. The configuration can be made using the button 112 and display 113 on 199 or from 200 using the application 204 and downloaded using a radio link such as a lower power RF like Blue Tooth Low Energy (or Bluetooth 4.0). Setting can also be stored in 207 and used by 208 for processing in conjunction with sensor information and data mining. Settings can be changed by the user at anytime, initial default values can be assumed for both values and whether a feature is on or off so that without configuration the device will function with default values.

At 902, wait for start calculation. As determined by an internal clock, the device 199 knows when it is a new day and begins auto sensing UV radiation, when UV or visible or Blue Light or infrared is first sensed it begins calculation from 903. The device may also be told manually to begin monitoring or monitoring can be reset to begin again at any point in time. The device may also be told to begin via 200, or 112 input on the device. The device may also be told to begin UV radiation monitoring via 200, or 112 input on the device. The device may also be told to begin Blue Light monitoring via 200, or 112 input on the device. The device may also be told to begin Vitamin D monitoring via 200, or 112 input on the device. The device may also be told to begin TLV monitoring via 200, or 112 input on the device. The device may also be told to begin Cosmetic monitoring via 200, or 112 input on the device. The monitoring of each of these monitoring cycles may be separately reset. For example Cosmetic monitoring where one goal is to perform monitoring over 1-10 days of conditions experienced by the skin to determine the best choice moisturizer.

At 903, monitoring is initialized. Values are setup to configured values and counter and cumulative values are reset. Consider the following example code:

```
// The skin type and correspond maximum time in the sun before burning
// Skin Type 1 - Maximum time in the Sun = 67 min / UVI
// Skin Type 2 - Maximum time in the Sun = 100 min / UVI
// Skin Type 3 - Maximum time in the Sun = 200 min / UVI
// Skin Type 4 - Maximum time in the Sun = 300 min / UVI
// Skin Type 5 -Maximum time in the Sun = 400 min / UVI
// Skin Type 6 - Maximum time in the Sun = 500 min / UVI
// Set the time for 1 UVI to burn according to the configured skin type
UVTimeBeforeBurnUVI1 = The burn time 426 is chosen depending on the skin type 400
// set the initial effective protection
UVEffectiveProtection = sunscreen 401
//Multiply the time for 1 UVI to burn the skin according to the sunscreen SPF.
UVTimeRemainingReApplication = UVTimeBeforeBurnUVI1 *  UVEffectiveProtection
//Check every 60 seconds the calculation and sensing of UV
UVTimeInc = 60 //seconds
//Set the Timer remaining according to the water resistance characteristics of the sunscreen
// If no water resistance them assume that if water contact then frequency reapplication is
required
UVWaterTimeRemaining = 20 min
// Extend the time before reapplication if user in the water if the sunscreen has water resistance
If(Water sensing 403 = water resistant) UVWaterTimeRemaining = 40 min
else
if(Water sensing 403 = very water resistant) UVWaterTimeRemaining = 80 min
//Skin Mosturiser check every minute
MoistTimeInc = 1 //mins
// Skin moisturiser time before reapplication in minutes.
// initially set to requiring reapplication after 4 hours
MoistTimeRemaining = MoisturiserReAppTime 431 as configured by the user for example
4 * 60;   //mins = 4 hours as a typical default value
// the MoistTotalTime is also set to MoistTimeRemaining so that at the end if the
//diifference between the two value when MoistTimeRemaining is significant then
// perhaps exposure or moisturizer properties should be reviewed to find a more
// appropriate moisturizer or change exposure conditions
MoistTotalTime = MoistTimeRemaining;
//Sets the Vitamin Daily Target (IU)
VitaminD_DailyTarget = Vitamin D dose 427
//variable to store the cumulative total for the day
VitaminD_DailyCumulativeDose = 0
// Counts the total time since start so that the Threshold Limit Value for UV radiation can
//be checked to see if it is exceeded
TotalTimeSinceStart = 0 // seconds
//Set Moisturizer settings
// The stronger the concentration the less often reapplication is required
MoisturiserConcentration = 428 as configured by user
// set according to the type of moisturizing being used for example humectants or emollients.
// This information can be used to decide of the ingredients according to the environment
// being sensed. For example a humectant may be better in humid conditions
// This
MoisturiserType = 429 as configured by user
//The user's skin type oily,normal,dry,verydry
// This information will help in recommendation of the correct moisturizer for use
MoisturiserSkinType = 430 as configured by user
//The ingredients that are in the sunscreen.
MoisturiserIngredients = 432 as configured by user
// reset all values
//For UVA, UVB and UVC components, Direct UV, Reflected UV and a Total UV level
being the sum of //Direct and Reflected is measured and stored.
UVATotal = 0;
UVADirect = 0;
UVAReflect = 0;
UVBTotal = 0;
UVBDirect = 0;
UVBReflect = 0;
UVCTotal = 0;
UVCDirect = 0;
UVCReflect = 0;
//For UVA, UVB and UVC components, the Total (Instantaneous Value) as well as a
cumulative value //since last reset of the monitoring and calculation is stored
UVACumTotal = 0;
```

-continued

```
UVATotal = 0;
UVBCumTotal = 0;
UVBTotal = 0;
UVCCumTotal = 0;
UVCTotal = 0;
//For UVA, UVB and UVC components a combine UVTotal and UVCumTotal combining all
the components is also calculated, the Total (Instantaneous Value) as well as a cumulative
value
//since last reset of the monitoring and calculation is stored
InstantaneousSkinDamage = 0;
CumulativeSkinDamage = 0; // Item 1004
UVTotal = 0; // Item 1001
UVCumTotal = 0; // Item 1002
UVOverExposure = 0; // Item 1003
```

When the user reapplies sunscreen or moisturizer then the appropriate values can be reset as per step 903 so that all values return to initial conditions. This may be done through the interface 112 on device 199 or from the smart phone 200.

At 904, Sensor values are read. The process for measuring, calculating and alerting, and reporting outcomes as shown in FIG. 9 can be carried out by software on the portable device 199 or a device such as a Mobile Computing Device 200 as well as devices attached by the internet or wifi such as 207 and 208. If the processing device has no direct sensor to determine a value required in calculations, it can obtain that value from another device 199, or connect to, for example a Mobile Computing Device 200 fitted with a GPS and internet and use 204 internet connection providing the GPS location to 203 retrieve data from other devices connected on the internet including 203, 205, 207. The Worst case option 417 Uses the highest UV exposure in the area, personal, local, city selected. If personal then it will use only the users own sensor devices such as 199, 303 values associated directly with the user. If local is selected then for any sensor reading used in calculation it will use the value which will give the most conservative alert level in the final results from the device 199 or any other device 199 nearby measuring this type of sensor value or any device such as Mobile Computing Device 200 nearby measuring this type of sensor or another sensor value available via the internet connection 204 from 205, 203, 207 or 208 providing that the location of the measurement is within 2 km of the location of the Mobile Computing Device 200 and device 199. If city is selected then for any sensor reading used in calculation it will use the value which will give the most conservative alert level in the final results from the device 199 or any other device 199 nearby measuring this type of sensor value or any device such as Mobile Computing Device 200 nearby measuring this type of sensor or another sensor value available via the internet connection 204 from 205, 203, 207 or 208 providing that the location of the measurement is within 40 km of the location of the Mobile Computing Device 200 and device 199. If more than three values are available for any area then values two stand deviations in the sample set shall be excluded and then the worst value remaining chosen. The instantaneous UV direction radiation UVDirectA can be obtained by measuring direct UVA radiation from 100. If 417 Worst case option is set to local then the device 199 using 202 can contact other instances of 199 to see if for the time period being considered a higher UV radiation level was recorded. If Worst case option 417 is set to local then the device 199 using 201 can request the 200 using 204 to contact 203 and see if for the time period being considered a higher UV radiation level was recorded set UVDirect to this level. If Worst case option 417 is set to city then the device 199 using 201 can request the Mobile Computing Device 200 using 204 to contact 205 and see if for the time period being considered a higher UV radiation level was recorded set UVDirect to this level. All the values for Light, Infrared and UV are in mW/cm2. In one example:

```
BlueLight = value from bluelight sensor 126
InfraRed = value from InfraRed sensor 127
VisibleLight = value from visiblelight sensor 110
//If separate senses for UVA, UVB and / or UVC are configured read separate values for
direct sensing
If(UVSensorConfiguration 437 = separate)
{
UVADirect = sensor measuring UV A from 100
UVBDirect = sensor measuring UV B from 100
UVCDirect = sensor measuring UV C from 100
}
else
// If there is only one UV radiation which measure UVA and UVB and optionally UVC
combined
If(UVSensorConfiguration 437= single)
{
UVDirect = sensor measuring UV A & UV B combined from 100
}
//If the device is configured with the ability to read a reflected UV value.
If(UVReflected 438 == on)
{
UVAReflect = sensor measuring UV A from 101
```

```
UVBReflect= sensor measuring UV B from 101
UVCReflect= sensor measuring UV C from 101
}
Else
//If the sensor only has single sensors for measuring reflected radiation
If(UVSensorConfiguration 437= single)
{
UVReflect = sensor measuring UV A & UV B combined from 101
}
```

At 905, UV direct radiation is calculated. Calculates the direct UV radiation falling on the sensor and hence the user. The sensor should be configured on the user in such a way that this can be measured. The sensing may use lens 124 to concentrate the radiation for angles if the sensor is not pointing directly at the source. In one example:

```
// If there are separate UVA, UVB and UVC values combine them to also
calculate
// an overall total UVDirect
If(UVSensorConfiguration 437 = separate)
{
UVDirect = UVADirect + UVBDirect + UVCDirect;
}
else
If(UVSensorConfiguration 437 = single)
{
UVDirect = UVDirect;
}
```

At 906, UV reflection radiation is calculated. If the device is configured with the ability to read reflected UV by way of sensors 101 then this step otherwise calculate the approximated reflected radiation by the percentage set in UV Radiation Reflection 423 if it is greater than zero and the feature is ON. If UV Radiation Reflection is zero, then if the Environment 406 variable is ON then set Reflect Percentage to this value. If Environment 406 is set to AUTO, the use the users location to identify a Reflect Percentage depending on the terrain corresponding to that position. Lastly calculate the Reflect values as a percentage of the direct UV. In one example:

```
If(UVReflected 438 == on) skip this step and continue at set 907
UVAReflect = 0;
UVBReflect = 0;
UVCReflect = 0;
UVReflect = 0;
ReflectPercentage = 0;
// If the device is configured to provide a reflection value otherwise the reflected value will be
0
if(UVRadiationreflection 423 ON)
{
   ReflectPercentage = percentage from 423;
   // if the value is zero and so hasn't been set try the following options to optain
   // a reflection value
   If(ReflectPercentage ==0)
{
      // If a percentage hasn't been set then use one of the prefigured terrain values
      If(Enviroment 406 ON)
      {
         Enviroment = Enviroment 406;
         If(Enviroment == water) ReflectPercentage = 20%
         Else
         If(Enviroment == sand) ReflectPercentage = 18%
         else
If(Enviroment == snow) ReflectPercentage =80%
         else
If(Enviroment == normal) ReflectPercentage = 10%
}
Else
If(Enviroment 406 AUTO)
{
         If the Enviroment Feature is set to AUTO the device 199 using 201 can
request the 200 using 204 to contact 205 and using the gps location provided by 200, to work
out the terrain and hence reflectivity for example water sand, snow, normal would return value
from 0-80 %. As one example, if snow was indicated, ReflectPercentage would be set to 80%
}
}
// Lastly calculate the Reflect values as a percentage of the direct UV
UVAReflect = ReflectPercentage * UVADirect;
UVBReflect = ReflectPercentage * UVBDirect;
UVCReflect = ReflectPercentage * UVCDirect;
UVReflect = ReflectPercentage * UVDirect;
```

At 907, total UV radiation from direct and reflected UV radiation is calculated. Having obtained values for the UV Direct and Reflected, instantaneous Totals UVATotal, UVBTotal and UVCTotal are calculated as well as cumulative values over the whole time when calculations are being performed UVACumTotal, UVBCumTotal, UVCCumTotal. From the UVA, UVB and UVC components UVTotal a total instantaneous value and UVCumTotal are also calculated. If sensors exist then calculate cumulative values for BlueLight, Infrared and Visible Light. Finally calculate the Total instantaneous UV exposure in UVI units. This will later be used in step 912 to inform the user which band of UV radiation their exposure falls into which is based on UVI units. In one example:
Where,

```
UVI 0-2 Green - Low
UVI 3-5 Yellow - Moderate
UVI 6-7 Orange - High
UVI 8-10 Red - Very High
UVI 11+ Violet - Extreme
UVATotal = UVADirect + UVAReflect;
UVBTotal = UVBDirect + UVBReflect;
UVCTotal = UVCDirect + UVCReflect;
UVACumTotal += UVATotal;
UVBCumTotal += UVBTotal;
UVCCumTotal += UVCTotal;
// Separate UVA, UVB and UVC values exist sum them together
If(UVSensorConfiguration = separate)
{
UVTotal = UVATotal + UVBTotal + UVCTotal;
UVCumTotal = UVACumTotal + UVBCumTotal = UVCCumTotal;
}
Else
If(UVSensorConfiguration = single)
{
UVTotal = UVDirect + UVReflect;
UVCumTotal += UVTotal;
}
// If sensors exist then calculate cumulative values for BlueLight, Infrared and Visible Light
BlueLightCumTotal += BlueLight;
InfraRedCumTotal += InfraRed;
VisibleLightCumTotal +=VisibleLight;
// Calculate the Total instantaneous UV exposure in UVI units. This will later be used in step
912 to
// inform the user which band of UV radiation their exposure falls into which is based on UVI
units
//UVI 0-2 Green - Low
//UVI 3-5 Yellow - Moderate
//UVI 6-7 Orange - High
//UVI 8-10 Red - Very High
//UVI 11+ Violet - Extreme
UVI Units = 25; // mW/m2
UVIUnitsTotalExposure = UVTotal / UVIUnits;
```

At 908, protection in SPF is calculated. Set the protection level to the sunscreen being used initially. Then calculate the amount of Clothing from the percentage of body 410 taking into account the hat also on top of this supplied percentage. The percentage of uncovered body is then multiplied by 10 and subtracted from the overall SPF protection. Ten SPF units have been allocated as the amount to indicate the negative SPF adjustment to make for no clothing regardless of SPF sunscreen being used. Reduction for no lip balm and no sunglasses. In one example:

```
// set the protection level to the sunscreen being used initially.
UVOverall_Protection = Sunscreen SPF 401;
//limit the level to 30 as values above this unrealistic.
if (UVOverall_Protection > 30) =30
//Calculate the amount of Clothing taking into account the hat also.
// This calculation is also used for Vitamin D calculation.
TotalClothingCoverage = 0
BodyClothingPrecentage = percentage of body covered by 410
TotalClothingCoverage = BodyClothingPercentage
// if the hat indicator 899 indicates that the hat is on
//or the hat has been configured to be on then increase the percentage of body covered by
15%
If( (hatindicator 899 off || 411 hat off ) == false)
```

```
{
    // Add 15% for the head exposure because not wearing a hat
    TotalClothingCoverage += 25%
}
If(TotalClothingCoverage > 100%) TotalClothingCoverage = 100;
// If no coverage (ie 0%) then subtract 10 SPF other wise
// Calculate the amount of SPF to reduce due to clothing coverage as below,
ClothingSPFToDeduct = 10 – TotalClothingCoverage * 10;
UVOverall_Protection –= ClothingSPFToDeduct;
// Reduce SPF by 1 for no lip balm
if(Lip balm 402 OFF) UVOverall_Protection –= 1
// Reduce SPF by 1 for no lip balm
if(sunglasses 425 OFF ) UVOverall_Protection –= 5
//Adjust the SPF by age to account to for children's skin being more sensitive as SPF doesn't
account for this
if(414 Age ON and infant) UVOverall_Protection –= 3
else
if(414 Age ON and preschool) UVOverall_Protection –= 2
else
if(414 Age ON and primary) UVOverall_Protection –= 1
// set to near zero if calculation takes the protection negative
if(UVOverall_Protection < 0) UVOverall_Protection = 0.01;
```

At 909, water activity is monitored. If the user enters the water and remains there, then for each Time increment this is monitored, that amount of time is subtracted from the safe life of the sunscreen application before reapplication is required due to water exposure. That time remaining being, UVWaterTimeRemaining. In this way the effect of water activity is accounted for depending on the water resistance value of the sunscreen. The UVWaterTimeRemaining is only adjusted when the user is in the water. In one example:

```
//If water user is in the water
if( moisture 103 )
{
    // reduce time remaining before re application required due to
    // water exposure.
    UVWaterTimeRemaining –= TimeInc
}
```

At 910, sweat is sensed. Sweat is treated as the time when the sunscreen is exposed to water and so is subtracted from the time that water resistant sunscreen lasts for. Sweat is predicted by heart rate and frequency of significant (>+=1 g) accelerometer movements which are counted to derive a relative intensity. If activity is not high but hot or humid weather or body temperature is elevated sweat is also registered. In one example:

```
//calculate the HeartAge as this effect s the determination of the level of exercise
if(Age 414 == "infant") "HeartAge" = 1
else
if( Age 414 == "preschool") "HeartAge" = 4
else
if( Age 414== "primary") "HeartAge" = 10
else
if( Age 414== "teen") "HeartAge" = 16
else
if( Age 414== "adult") "HeartAge" = 40
else
if(Age 414== "elder") "HeartAge" = 60
// determine the level of exercise
"HeartRate" = read from sensor 125
"MaxMHR" = 220 – "HeartAge"
"LowExercise" = 0.5 * "MaxMHR"
"ModerateExercise" = 0.6 * "MaxMHR"
"HighExercise" = 0.7 * "MaxMHR"
// activity related sweating
if("HeartRate" > "HighExercise")
{
    UVWaterTimeRemaining –= "TimeInc" *2
}
else
if("HeartRate" > "ModerateExercise")
{
    UVWaterTimeRemaining –= "TimeInc" * 1
}
else
// Subtract some Time remaining due to sweat indicated by activity
if( 108 intensity high)
{
    UVWaterTimeRemaining –= TimeInc/2;
}
```

```
Else
// Subtract some Time remaining due to sweat indicated by raised body temperature
if( 104 body temp > normal)
{
UVWaterTimeRemaining -= TimeInc/4;
}
// climate related sweating
// Subtract some Time remaining due to sweat indicated by air temp being above normal
if(106 air temp > normal)
{
UVWaterTimeRemaining -= "TimeInc/4"
}
Else
// Subtract some Time remaining due to sweat indicated by humidty
if( 107 humidity > 80%)
{
    UVWaterTimeRemaining -= "TimeInc/3"
}
```

At 911, the time remaining before reapplication of sunscreen is calculated. The time before reapplication of sunscreen takes into account the Skin Type and so time before burning set burning, the protection by sunscreen and clothing, the level of UV exposure, and the time of exposure. In one example:

```
//calculate the time remaining based on the protection and Exposure
// The time to subtract is proportional to increased exposure but this number should
//be divided by the protection which should reduce the rate at which sunscreen breaks down
UVTimeRemaingReApplication -= ( 1 min / UVOverall_Protection) *
UVIUnitsTotalExposure ;
// When no more time as defined by UV exposure adjust by protection
if(UVTimeRemainingReApplication < 0 && UVDirect > 0 )
{
       Display Reapply Sunscreen Message or stop UV radiation exposure, Visual 113,
Vibration 114, Sound 115, or via the connection 201 on 200 . Additionally to display on 199
send to other devices attached by the low power wireless ,internet or wifi such as 207 and
208.
}
//when no more time as defined by water resistance
if(UVWaterTimeRemaining < 0 && moisture 103 && UVDirect > 0 )
{
       Display Reapply Sunscreen because of water usage or stop UV radiation exposure,
Visual 113, Vibration 114, Sound 115, or via the connection 201 on 200. Additionally to
display on 199 send to other devices attached by the low power wireless ,internet or wifi such
as 207 and 208.
}
```

At 912, calculate and display UV radiation. All instantaneous "Total" UV radiation values for UV and cumulative values "CumTotal" can be displayed as well as visible and infrared. Level or Bar Graph displays as well as line graphs of radiation progression may be shown. The UVI rating may also have a similar display also using the standard color index, Green—Low, Yellow—Moderate, Orange—High, Red—Very High, Violet—Extreme. In one example:

```
// Show the total instantaneous UV reading
UVTotal = UVATotal + UVBTotal + UVCTotal;
```

```
//Read the total Cumulative UV reading
UVCumTotal = UVACumTotal + UVBCumTotal +UVCCumTotal;
BlueLightCumTotal += BlueLight;
InfraRedCumTotal += InfraRed;
VisibleLightCumTotal +=VisibleLight;
```

The skin type 400 can be used to increase the amount of exposure with more exposure added by multiplying by (7—SkinType 400) as lighter SkinType 400 1 will get more UV over exposure more quickly. In one example:

```
// When there is no sun screen protection remaining begin to accumulate over exposure
If(UVTimeRemaining <0)
{
     UVOverExposure += UVTotal * (7-SkinType 400) ;
}
// Skin Damage is caused more by UVA so a multiplier is applied to the UVA reading to
contribute a larger effect from UVA , UVB does to a lesser degree also contribute to skin
damage.
```

```
UVAMultipler = 2;
//Skin Damage occurs more quickly than just the UV overexposure causes skin cancer.
SkinDamageMultiplier = 2;
InstantaneousSkinDamage = (UVATotal * UVAMultiplier ) + UVBTotal;
InstantaneousSkinDamage = InstantaneousSkinDamage * SkinDamageMultiplier;
//If the Protection from sun screen has run out, then increase the skin Damage
If(UVTimeRemaining < 0)
{
    InstantaneousSkinDamage = InstantaneousSkinDamage * (7-SkinType 400) ;
}
}
CumulativeSkinDamage += InstantaneousSkinDamage;
Display UVTotal, UVATotal, UVBTotal, UVCTotal, UVCumTotal, UVACumTotal,
UVBCumTotal, UVCCumTotal, BlueLightCumTotal, InfraRedCumTotal,
VisibleLightCumTotal, UVOverExposure, SkinCancerRisk value, Visual 113, Vibration 114,
Sound 115, or via the connection 201 on 200. One implementation would use a progress bar or
bar graph or line graph on the display of 200.
Display UVTotal, UVATotal, UVOverExposure, CumulativeSkinDamage can be display
separately in the context of rating of effect on beauty, value, Visual 113, Vibration 114, Sound
115, or via the connection 201 on 200. One implementation would use a progress bar or bar
graph or line graph on the display of 200.
```

Figure 10:
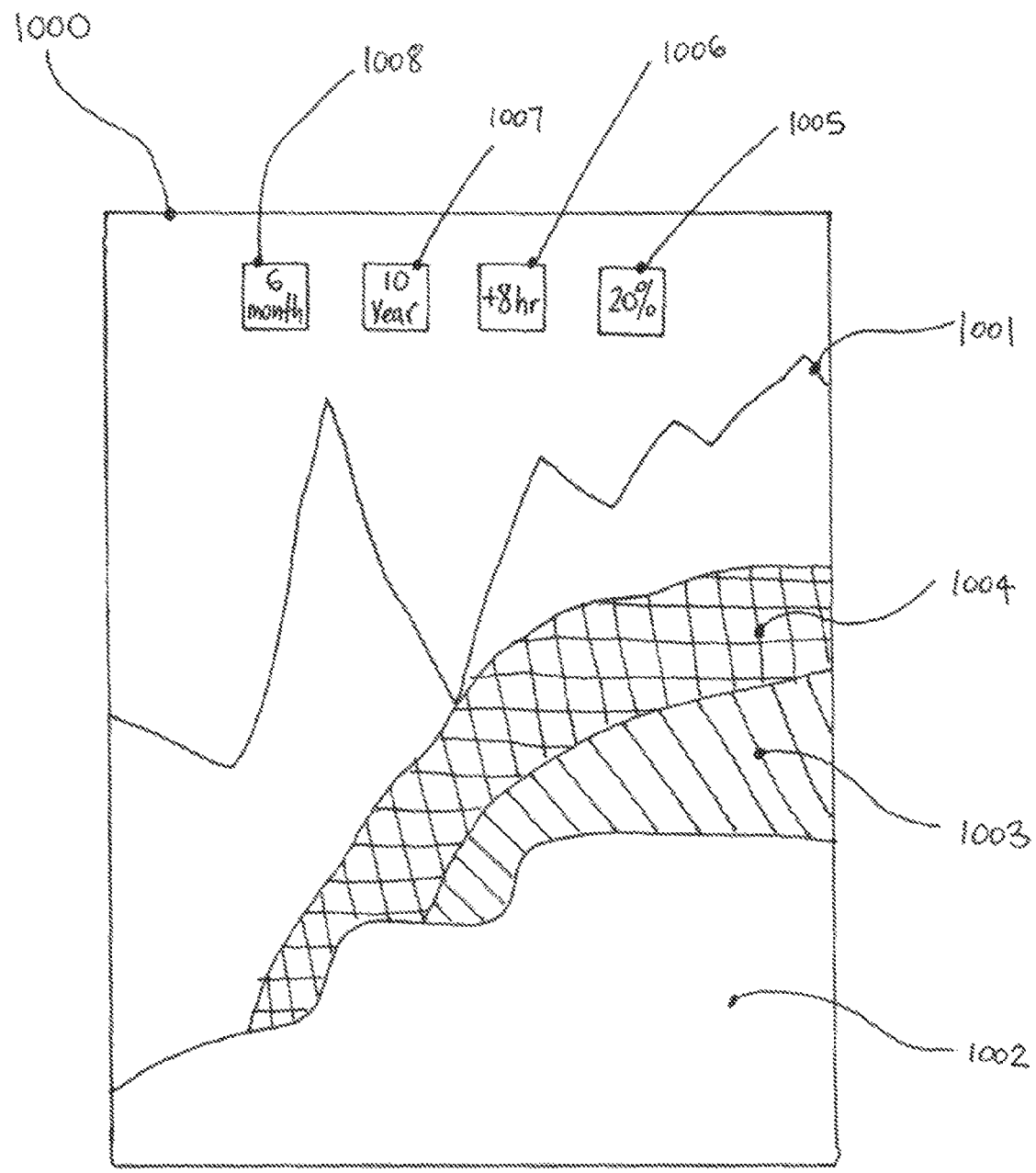
FIG. 10 depicts one embodiment of information in the form of a graph displayed to the user to show cumulative UV exposure as well as over exposure where the sun screen in not present. As well as skin damage.

Referring to FIG. 10, the UVOverExposure, and the CumulativeSkinDamage can be displayed in the depicted Graphical format 1000.

```
//http://en.wikipedia.org/wiki/Ultraviolet_index
//UVI 0-2 Green - Low
//UVI 3-5 Yellow - Moderate
//UVI 6-7 Orange - High
//UVI 8-10 Red - Very High
//UVI 11+ Violet - Extreme
//These are expressed in UVI units = 25 mW/m2
// 25mW/m2 divide by 100×100 = > 0.0025mW/cm2
//initially set as low advance based on level
UVI_Rating = Low
If(UVIUnitsTotalExposure <= 2) // green
{
    UVI_Rating = Low
}
Else
If(UVIUnitsTotalExposure <= 5) // yellow
{
    UVI_Rating = Moderate
}
Else
If(UVIUnitsTotalExposure <= 7) // orange
{
    UVI_Rating = High
}
Else
If(UVIUnitsTotalExposure <= 10) // Red
{
    UVI_Rating = Very High
}
Else // Purple
{
    UVI_Rating = Extreme
}
```

Display UVI_Rating value, Visual 113, Vibration 114, Sound 115, or via the connection 201 on 200 indicating the ratio is potentially unhealthy particularly for Vitamin D production. One implementation would use a progress bar or bar graph or line graph on the display of 200. Additionally to display on 199 send to other devices attached by the low power wireless, internet or wifi such as 207 and 208.

At 913, vitamin D is monitored. Vitamin D production may be impaired if the UVA level relative to UVB exceeds 20 then this can be unhealthy for the body inhibiting Vitamin D production. This may occur for example if the user spends time receiving sun light through a window for example when driving. This is because glass filters out UVB but not UVA. Users may wish to receive information as to whether they have produced their desired Vitamin D Levels on a daily and longer term basis. This is calculate by calculating body coverage. One example of the process to calculate the amount of Vitamin D generated from exposure involves firstly, converting the UVBTotal reading to UVI units by dividing by the variable OneUVI. Then convert to MED (Minimum Erythemal Dose) by dividing by 2.33 because 2.33 UVI is equal to 1 MED. Next calculate the amount of Vitamin D per MED from the MaximumIUVitD that can be generated taking into account skin type and protection levels. This amount is called IUVitaminCanGenerate. Then multiply the IUVitaminCanGenerate by the number of MED by the fraction of the current time increment in this case in seconds over the total seconds in one hour. In one example:

```
// The ratio of UVA:UVB light from the sun is 10:1 to 20:1
// When the UVA level realive to UVB exceeds 20 then this can be unhealthy for the body
inhibiting Vitamin D production
UVABRatio = UVATotal / UVBTotal;
If(UVBRatio > 20)
{
    Display UVA :UVB Ratio Vitamin D ratio is potentially unhealthy particularly for
Vitamin D production, Visual 113, Vibration 114, Sound 115, or via the connection 201 on
200. Additionally to display on 199 send to other devices attached by the low power
wireless ,internet or wifi such as 207 and 208.
    Display UVA :UVB Ratio indicates that even though the user is not exposed to harmful
UVB UVA radiation may from a cosmetic point of view be causing skin damage , Visual 113,
```

-continued

```
Vibration 114, Sound 115, or via the connection 201 on 200. Additionally to display on 199
send to other devices attached by the low power wireless ,internet or wifi such as 207 and 208.
}
//1 UVI = 1/25mw/cm2  /hr   or 1 UVI = 0.04 mW/cm2 /hr
//2.33 UVI per MED/hr
OneUVI = 0.04; // 1 UVI = 0.04 mW/cm2
// find out how many med the UVBTotal exposure is
VitaminD_Delta_med = ((UVBTotal /OneUVI) /2.33); // med per hour
// Calculate the largest possible IU Vitamin which can be produced given sunscreen protection
// and the skin type for one MED. For example, Dark skin generates less Vitamin D per hour
Depending on the skin type 400 one of the following UI units maximum per hour with no
protection is selected for MaximumIUVitD.
// Skin Type 6 - MaximumIUVitD = 67 IU Vitamin D
// Skin Type 5 - MaximumIUVitD = 100 IU Vitamin D
// Skin Type 4 - MaximumIUVitD = 200 IU Vitamin D
// Skin Type 3 - MaximumIUVitD = 300 IU Vitamin D
// Skin Type 2 -MaximumIUVitD = 400 IU Vitamin D
// Skin Type 1 - MaximumIUVitD = 500 IU Vitamin D
//Calculate the proportion of the MaxiumuIUVitD that can be generated based on
// SPF protection level. The higher the protection the lower the Vit D that can be generated.
If(UVOverall_Protection > 30 SPF)
{
    IUVitaminCanGenerate = 0.25 * MaximumIUVitD;
}
Else
If(UVOverall_Protection > 20 SPF)
{
    IUVitaminCanGenerate = 0.5 * MaximumIUVitD;
}
Else
If(UVOverall_Protection > 10 SPF)
{
    IUVitaminCanGenerate = 0.75 * MaximumIUVitD;
}
Else
{
    IUVitaminCanGenerate = 1 * MaximumIUVitD;
}
// Adjust the IUVitaminCanGenerate per Med hour based on fraction of an hour = 3600s
//for the delta of Vitamin D generation
VitaminD_Delta = (IUVitaminCanGenerate * VitaminD_Delta_med) * (TimeInc/3600);
// If for medical reasons the ability of the user's body to absorb UVB and convert to Vitamin D
differs // from a typical person (100%) then the AbsorptionPercentage can be adjusted up or
down.
AbsorptionPercentage = 100%;
VitaminD_Delta = VitaminD_Delta * AbsorptionPercentage
//increase the cumulated daily Vitamin D dose during the day and reset each night
VitaminD_DailyCumulativeDose += VitaminD_Delta;
//increase the cumulated weekly Vitamin D dose during the week and reset each week
Vitamin D_weeklyCumulativeDose += VitaminD_Delta;
Display VitaminD_DailyCumulativeDose and VitaminD_WeeklyCumulativeDose value,
Visual 113, Vibration 114, Sound 115, or via the connection 201 on 200 One implementation
would use a progress bar on the display of 200. Additionally to display on 199 send to other
devices attached by the low power wireless ,internet or wifi such as 207 and 208.
// track the daily dosage so that the user is know when they have enough exposure so that they
// do not need to get sunburnt trying to get the Vitamin Target in one day.
If(VitaminD_DailyCumulativeDose > VitaminD_DailyTarget)
{
    Display Alert to indicate Vitamin D daily dose achieved, Visual 113, Vibration 114,
Sound 115, or via the connection 201 on 200. Additionally to display on 199 send to other
devices attached by the low power wireless ,internet or wifi such as 207 and 208.
}
If the weekly dosage Vitamin D_weeklyCumulativeDose is not on track to the target
(VitaminD_DailyTarget * 7 ) then to avoid the user needing a large dose in any one day and
so risk sun burn the application 204 will alert the user that he is will not stay on track to
achieve weekly dosage without sunburn unless he achieves VitaminD_DailyTarget or falls
before more than a certain number of days.
```

At 914, moisturizer reapplication and suggestions are submitted. To determine when the moisturizer should be reapplied a multiplier is calculated to determine how quickly the time to reapplication is reduced. The multiplier is initially set to 1 minute decrement for each minute that transpires but other factors can increase the rate of decrement so that the for each minute of time that passes the time till reapplication is reduces by more than 1 minute depending on the multiplier. Conditions such as strong wind, low or high temperature, age of the users skin, exercise (and so sweating) and water exposure and other factors may all work together to decrease the length of time that a moisturiser is effective before it needs to be reapplied. The user is told when the moisturizer should be reapplied as well as suggestions for different products depending on the factors such as humidity. If configured to do so an alert can also be given to remind the user to remove moisturizer and cosmetics used in the day and apply cosmetics appropriate to the night. For example,

```
//Begin with the multiplier being set to 1 so that the time is faster than an average reapplication
time.
MoistMult = 1;
//According to how could the temperature is then increase the multiplier
If(temp cold < 5 ) MoistMult = 2;
If(temp cold < 0) MoistMult = 3;
If(temp cold < −10) MoistMult = 4;
//According to how hot the temperature is then increase the multiplier
If(temp > 30) MoistMult = 1.5
If(temp > 40) MoistMult = 3
//High humidity will also affect the Moisturizer's life span on skin
//if temp, humidity can't be picked up from device 199 then read from 200, or other devices
connected
// as previously described
If (humidity < 30)
{
    MoistMult += 2;
}
// water exposure will also cause the need for more frequent re application
if(403 water sensing > 10% of time in water)
{
    MoistMult +=2;
}
// Wind speed causes moisturizer wear and at the skin also requires more moisturization.
// According to the Beaufort_scale wind speed in KmperHour,
//29-38 km/hr = fresh, 39-49 = strong, 50-61 = high
// fresh wind
If (WindSpeed > 29 and WindSpeed <= 38 )
{
    MoistMult += 1.2;
}
Else
//strong wind
If (WindSpeed > 38 and WindSpeed < =49 )
{
    MoistMult += 1.6;
}
Else
//high wind add the most amount of multiplier to reduce time remaining to reapplication
If (WindSpeed > 49 ) //fresh
{
    MoistMult += 2;
}
// The amount of exercise also influences sweat rate and so loss of
//moisturizer
//High exercise increases the need for more moisturizer
if("HeartRate" > "HighExercise")
{
    MoistMult += 2;
}
Else
// Moderate exercise increases the need for more moisturizer
if("HeartRate" > "ModerateExercise")
{
    MoistMult += 1;
}
Else
// If the heart sensor is not present if activity is high as determined by a count of accelerator
movement
//over +/− 1g in any direction then this is considered same as High Exercise.
If(407 accelerometer = high)
{
    MoistMult += 2;
}
// Strong UV then decrease the time before reapplication
If( UVI_Rating High or UVI_Rating = Very High )
{
MoistMult += 1;
}
else
If( UVI_Rating = Extreme )
{
MoistMult += 2;
}
//adjust for Moisturister reapplication time depending on moisturizer concentration
If(MoistConcentration 428 = medium)
{
    MoistMult −=1;
}
else
If(MoistConcentration 428 = high)
```

```
{
    MoistMult -=2;
}
// Reduce the time before moisturizer reapplication depending on the skin type and needs of the
// user. If the skin is dry ir very dry then the moisturizer will need reapplication sooner.
If(MoisturiserSkinType 430 = dry)
{
    MoistMult +=1;
}
Else
If(MoisturiserSkinType = very dry)
{
    MoistMult +=2;
}
// Reduce the time before moisturizer reapplication depending on the skin type and needs of the
// age of the user, if they are older as the skin will need more hydration
If(Age 414 = elder)
{
    MoistMult +=1;
}
// Count the total time since moisturizer was applied.
MoistTotalTime -=1;
//Count the time remaining to reapplication of the moisturiser.
//the calculation of the MoistMult accounts for
MoistTimeRemaining -= 1* MoistMult;
//if there is no time remaining before re application then warn the user time for reapplication
If(MoistTimeRemaining <= 0)
{
        Display User should reapply Moisturizer Cream, Visual 113, Vibration 114,
Sound 115, or via the connection 201 on 200. Additionally to display on 199 send to other
devices attached by the low power wireless ,internet or wifi such as 207 and 208.
        // the MoistTotalTime is also set to MoistTimeRemaining so that at the end if the
//difference between the two value when MoistTimeRemaining is significant then
// perhaps exposure or moisturiser properties should be reviewed to find a more
// appropriate moisturiser or change exposure conditions
        If(MoistTime > 60 mins)
        {
                Display Suggestion changes to concentration of moisturiser of
alternative product or shorter re application time, Visual 113, Vibration 114, Sound 115, or via
the connection 201 on 200. Additionally to display on 199 send to other devices attached by
the low power wireless ,internet or wifi such as 207 and 208.
        }
        // if humidity is low alert the user about moisturizer choice
        If(humidity < 30)
        {
Display Suggestion for low humidity emollient product, Visual 113, Vibration 114, Sound 115,
or via the connection 201 on 200. Additionally to display on 199 send to other devices
attached by the low power wireless ,internet or wifi such as 207 and 208.
        }
        Else
        //if the humidity is high alert the user about moisturizer choice.
        If(humidity > 70)
        {
Display Suggestion for high humidity Humectant product, Visual 113, Vibration 114, Sound
115, or via the connection 201 on 200. Additionally to display on 199 send to other devices
attached by the low power wireless ,internet or wifi such as 207 and 208.
}
}
//if the user has selected the option to remind about Nightchanging the moisturizer, perhaps
involving //removing moisturizer and other cosmetics and apply night appropriate
formulations
// then this alert is generated
If(434 NightChange timer == night)
{
Display Remind remove make up apply night rejuvenation cream, Visual 113, Vibration 114,
Sound 115, or via the connection 201 on 200. Additionally to display on 199 send to other
devices attached by the low power wireless ,internet or wifi such as 207 and 208.
}
```

At 915, a water consumption alert is processed. Appropriate water consumption is an important factor to maintain human health including also Skin health. An alert can be spaced throughout the day, dependent on the age of the person, temperature and activity level to remind them to drink water. Alternatively, a water bottle can be instrumented with a sensor 199 that can detect when a contact is open through an extra addition of a switch sensor or an accelerometer to sense the opening or dispensing of water. Each time liquids are consumed then the NumberDailyGlass is increased by the correct increment which can be deduced from the length of time the dispenser is tipped up during pouring as one example. In addition to water other beverages may be suggested for consumption each with configurable amounts of liquid to consume based on the beverage. In one example:

Device 200 or if the hat or other device has been taken off and there is UV radiation present. If the wearer of the device is a child then the an alert can be generate if the child's device 199 is no longer in contact with for

```
                // set the daily water requirement according to age
WaterDailyAmt = 0;    //ml
If(WaterAlert 436 )
{
if(Age 414 == "preschool") WaterDailyAmt = 1300;
else
if( Age 414 == "primary") WaterDailyAmt = 1700;
else
if( Age 414 == "teen") WaterDailyAmt = 2200;
else
if( Age 414 == "adult") WaterDailyAmt = 3000;
else
if(Age 414 == "elder") WaterDailyAmt = 3000;
//increase the daily water requirement if the temperature is high
if(temp > 30)
{
    WaterDailyAmt += WaterDailyAmt * 0.2;
}
Else
//increase the daily water requirement if the exercise rate is moderate or high
if("HeartRate" > "HighExercise" or "HeartRate" > "ModerateExercise"))
{
    WaterDailyAmt += WaterDailyAmt * 0.1;
}
Else
//increase the daily water requirement if the exercise rate is moderate or high
If(407 accelerometer = high)
{
    WaterDailyAmt += WaterDailyAmt * 0.1;
}
    StandardGlassSize = 250 ; //mL
    NumberDailyGlass = WaterDailyAmt/StandGlassSize;
    SetTimer to Alert User for NumberDailyGlass number of times to drink water.
    if (timer expires and still glasses of water to consumer remaing)
{
        Display remind to consume a glass of water and remind of health and cosmetic
benefit of consuming water, Visual 113, Vibration 114, Sound 115, or via the connection 201
on 200. Additionally to display on 199 send to other devices attached by the low power
wireless ,internet or wifi such as 207 and 208.
}
}
```

At 916, a check of whether the device is being worn is checked. Alerts the user either directly wearing the hat or device or another user who can monitor if a hat is being warn for example for a Mobile Computing example a Mobile Computing Device 200. A child's device 199 may go out of range for example if the child falls in the swimming pool or walks a long way from the parent. For example,

```
If(check hat on 411 and UVTotal > 0 and (pressure sensor 302 off or accelerometer low
activity) )
{
    Display Warning child no longer wearing hat UV radiation present, Visual 113,
Vibration 114, Sound 115, or via the connection 201 on 200. Additionally to display on 199
send to other devices attached by the low power wireless ,internet or wifi such as 207 and 208.
}
If(device being 422 and pressure sensor 111 off )
{
    Display Warning child no longer wearing UV monitoring device but UV radiation
present, Visual 113, Vibration 114, Sound 115, or via the connection 201 on 200. Additionally
to display on 199 send to other devices attached by the low power wireless ,internet or wifi
such as 207 and 208.
}
// check hat warn at lunch time.
If(check hat on 411 and pressure sensor 302 off or acidometer low activity and timer == lunch
time )
{
    Display Warning child no longer wearing hat or device but UV radiation present, Visual
113, Vibration 114, Sound 115, or via the connection 201 on 200. Record this event for later
replay for example when the child goes home after not wearing at lunch time at school.
Additionally to display on 199 send to other devices attached by the low power
wireless ,internet or wifi such as 207 and 208.
}
```

```
//check if the person wearing the device 199 is a smaller child then warn the user perhaps on
the
// a device such as a smart phone 200, if the device the child is wearing is no longer
contactable
//for a variable period of time. This may be used to indicate if that the child is in the water and
remind //the parent to watch the child or check the child is safe or it may be used to ensure the
child is within a // safe distance by varying the strength of the devices 199 transmitter so that it
only works up to a //certain distance before which contact is lost
if(435 WaterSafeAlarm)
{
If (age == infant or age == primary or age == preschool)
{
    If(contact lost with device 199 from 200 for some period of time)
    {
        Display Warning child device no longer in contact check child safe, Visual 113,
Vibration 114, Sound 115, or via the connection 201 on 200. Additionally to display on 199
send to other devices attached by the low power wireless ,internet or wifi such as 207 and 208.
    }
}
}
```

At 917, data publishing and storage occurs. The 199 device can share and receive sensor measurements and calculated data with other 199 device via 202 as well as 200 and other devices via 204 internet connection including storing data on 207 database and processing unit 208.

At 918, data mining and processing occurs. Measured data from devices in this system in FIG. 2 can be used to help users understand their UV radiation exposure beyond any one day of exposure as long term profiles. This allows patterns to be discovered and actions to reduce UV exposure to be made based on this information. The same may be done for skin moisture. Measurements can be presented in graphical formats overplayed with the activates, location, terrain, clothing worn at the time to educate on the effect of sun exposure and protection choices and as a game and in different graphing formats. Rewards may be also given in response to children wearing sun protection and managing their radiation well. The data is stored in a database that may also be used for research on results over many users and many years. Data mining may identify habits of sun exposure and protection that can modified to reduce exposure for individuals and for the wider population. Physicians such as skin specialists, cancer specialists and dieticians may also be access individual and population data.

In a cosmetic applications where the target is also the preventing skin damage, lower threshold can be set on exposure as skin damage may occur even below the maximum UV exposures prescribed for UV protection alone. Overall exposure may also be used to work out when skin damage. For both UV and cosmetic applications (particularly maintaining skin moisture) as well as the monitoring of Vitamin D levels users can provide input (perhaps as votes about the effectiveness) about their state such as whether they have experience sunburn or skin dryness, depending on this feedback if protection has not been sufficient based on this feedback then the calculations used in device 199 or 200 or other devices can be adjusted to try and better manage protection, alternative products may also be recommend or a change in habits such as how much time is spent in the environment causing the exposure, for example such as time in the sun.

A trade off exists between managing vitamin D levels and while maintain sun exposure. Methods such as suggesting the application of lower SPF until Vitamin D levels are reached for the day followed by immediate reapplication of a higher SPF sunscreen. These decisions can be made using device 207 and 208 with decisions pushed to devices such as 199 and 200 to make the measurement, calculations and alert the user. Using the data 207 and processing algorithms on 208, data collected over a period of time from sensors on 199, 200 and other sources such as weather information, as well as user input on the condition of their skin such as dryness, irritation, excessive oils, low Vitamin D levels as some examples, as well as product information such as cosmetics, moisturizers, sunscreens, lip balms, supplements and medicines. The processing unit 207 may return to the user through 199, 200 alerts and information about types of products such as cosmetics, moisturizers, sunscreens, lip balms, and medicines and times of application as well as environments and amounts of exposure by time to avoid. Devices and software on those device including 200, 204, 199 may also present questions to the user and receive responses through 112, 113 or 204. This responses may be used to refine algorithms such as reduce reapplication times if the user reports skin redness from sun exposure. The data collected from the sensors on devices 199, 200, 205, 203, 207 and 208 can also be combined to build up a dynamic weather measurement system providing coverage wherever sensors exist. This data can be presented as a real time weather map as one example.

At 919, an alert, suggestion, and questionnaire may occur. Data to and from 199 can be received from and sent to 200, 207 and 208 or application 204 including an alert or suggestion or questionnaire. In the case of a questionnaire the information request may be to allow the software on 207, 208 or 204 to adapt calculations to achieve a better result for example, ask if the skin is red and use an affirmative answer to reduce the reapplication time in future. Or alert provide a suggestion to the user on devices 199 or 200. For example,

```
If( Alert, suggestion from 207, 208, 204)
{
    Display Alert, Suggestion, Visual 113, Vibration 114, Sound 115,
or via the connection 201 on 200
}
If( questionnaire from 207, 208, 204)
{
    Display questionnaire, Visual 113, Vibration 114, Sound 115, or
via the connection 201 on 200
    Receive input from user on devices 199 or 200 via 112, 204
    Send input and process information to 199,207,208, 204
}
After completion of 919 the processing returns to repeat the cycle of
actions at 904.
```

FIG. 10 depicts one embodiment of information in the form of a graph displayed to the user to show cumulative UV exposure as well as over exposure where the sun screen in not present. As well as skin damage. Referring to FIG. 10, it shows one example of information in the form of a graph displayed to the user to show Instantaneous UV 1001 exposure as well as cumulative UV 1002 exposure as well as cumulative UV over exposure 1003 beyond safe levels. The UV over exposure is the UV exposure accumulated for the length of time since sunscreen reapplication has been exceeded without reapplication and so no sun screen protection is present. The skin damage 1004 is also shown where the skin damage may include any marks such as sun spots, freckles and wrinkling caused by the sun and UV exposure. The presentation of cumulative UV overexposure 1003 can be displayed as either UV energy over area received for example (mW/cm2) or converted by a multiplication factor which may be fixed or vary with skin type or concentration of exposure into a cancer risk number 1005 that can be based on a defined risk variable (which is proportional to factors such as the chance that the sun screen is wearing off, or hasn't been effectively applied to all exposed areas), if this exposure and duration occurred for a different numbers of hours each week over the long term. The number of hours that the exposure is estimated to have occurred to arrive at the cumulative risk can be ascertain from hours measured based on the UV sensors 100 number of hours when UV sensed or the user may enter this on configuration of the system. The presentation of cumulative skin damage 1004 can be displayed as either UV energy over area received for example (mW/cm2) or converted by a multiplication factor which may be fixed or vary with skin type or concentration of exposure into a skin ageing number in hours of skin ageing 1006 or assuming an average duration of weekly exposure can be determine by measuring the time the sensor 100 measure UV or via a configuration setting in the application on the smart phone the total hours, weeks, month or years skin ageing extrapolated based on the average regular exposure to calculate a per year value 1007 can be displayed or alternatively the cumulative total the device has recorded for the user can be shown. The number of hours that the exposure is estimated to have occurred can be ascertain from hours measured based on the UV sensors 100 number of hours when UV sensed or the user may enter this on configuration of the system. Skin ageing is considered to be proportional to UVA and UVB exposure as set by a single or two separate multiplier constants to the amount of UVA as well as UVB. The UVA multiplier constant may be higher as skin ageing is often considered to be more influenced by UVA radiation penetration into the skin. Skin ageing can be considered to occur regardless of the whether sun protection is applied (as simply a proportion as set through a multiplier variable of UV exposure) or with a higher multiplier once over exposure occurs. The cumulative hours of skin ageing 1008 prevented by the application of products containing sun screen protection and/or ingredients that can restore or repair skin damage can be calculated and displayed by taking the UV exposure and the products effectiveness to block the UV and to repair any UV damage that does occur (or following a failure to re apply). This FIG. 1008 is helpful for promoting the effectiveness of the product where there is little tangible evidence of products effective working. For reference, 1000—The graphical display in an application 204 on a Mobile Computing Device 200, with the purpose of providing graphical display of specific information that is designed to help the user understand the cost to their health of the activity or lifestyle decisions. Examples of this include the display of skin cancer percentage risk of regularly receiving the UV exposure, or the ageing that has just occurred as the result of a decision to sunbake for a certain length of time. The display is designed to motivate the user to consider the future effect of the current UV exposure activity. As the effects are difficult to appreciate on a day to day basis presentation of long term effects should act to close the conceptual gap between the risk of being exposed now on this one occasion and what may occur with continual exposure, where the long term accumulated effect expressed as numbers such as weeks or possibly years of skin ageing or cancer risk become significant and large which may even shocking the user to change behaviour. In the case of skin care products it is difficult to quantify the benefit of the product in the short term. To appreciate the effectiveness of the product ideally the user should be able to view the unprotected skin after a period of time over which a skin damage has noticeably occurred and simultaneously view the same skin with the product regularly applied to be able to appreciate the skin ageing saving that has occurred from the use of the product. As this is not practical, and would require time to establish, the method suggested and depicted in FIG. 10, is to measure the UV radiation exposure, use parameters for the sunscreen and clothing protection to offset this exposure and find the resultant UV radiation exposure to the skin from which skin cancer risk or ageing can be calculated. For ageing, if present Moisturisers, can also be used to offset the resultant UV radiation to determine the amount of ageing where the UV exposure and ageing are linked by an empirical constant. The user can then be shown the difference between the ageing with and without the product. The difference being a demonstration of the effect in reducing ageing. The expression of an otherwise intangible product effectiveness claim in such an object manner would be highly advantageous to cosmetic promotions. Weather values from a server or from the sensor 199 and or combined with whether the person is inside or outside, which would discount the affects or reduce them, are used to calculate the exposure.

Figure 11:
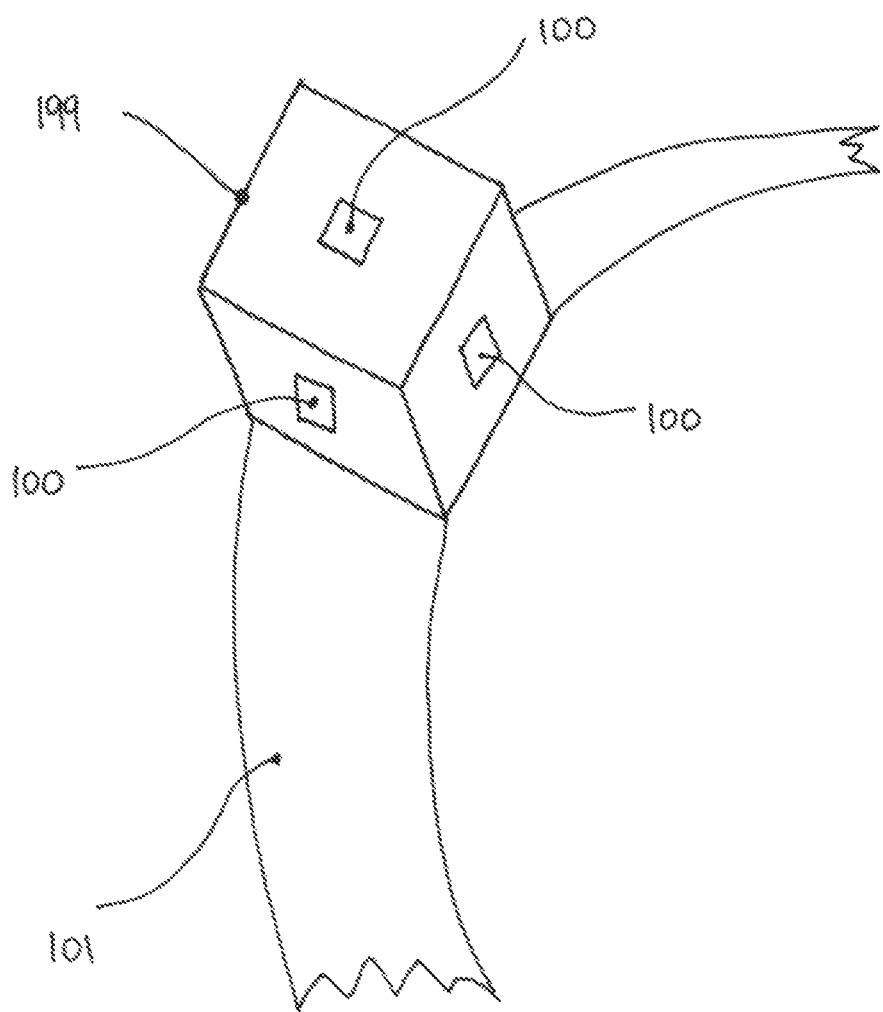
FIG. 11 depicts one embodiment of one possible arrangement of UV sensors on a device 199 which will give the device an increased chance of ascertaining the highest UV sensor reading regardless of the orientation of the device to the sun.

FIG. 11 depicts one embodiment of one possible arrangement of UV sensors on a device 199 which will give the device an increased chance of ascertaining the highest UV sensor reading regardless of the orientation of the device to the sun. Referring to FIG. 11, it shows one possible arrangement of UV sensors on a device 199 which will give the device an increased chance of ascertaining the highest UV sensor reading regardless of the orientation of the device to the sun. The diagram shows three UV sensors 100, however an additional three sensors can be attached so that each surface of the device 199 to further increase the chance of any one UV sensor 100 having direct or close to near direct orientation to the UV radiation source being measured. The device 199 can collect UV sensor values from each sensor 100 and choose the highest, worst case, conservative reading as the one that is in probability the direct UV radiation reading. The system can learn at which orientation as determined by accelerometers in x, y and z axis a maximum UV value is found and use this to repeat measurements to find subsequent highest values. If only one sensor is configured however many samples can be taken if the device is moved around as determined by the accelerometers x, y and z and the highest selected. Again the system can learn the x, y and z axis values at which the highest value is usually found.

Figure 12:
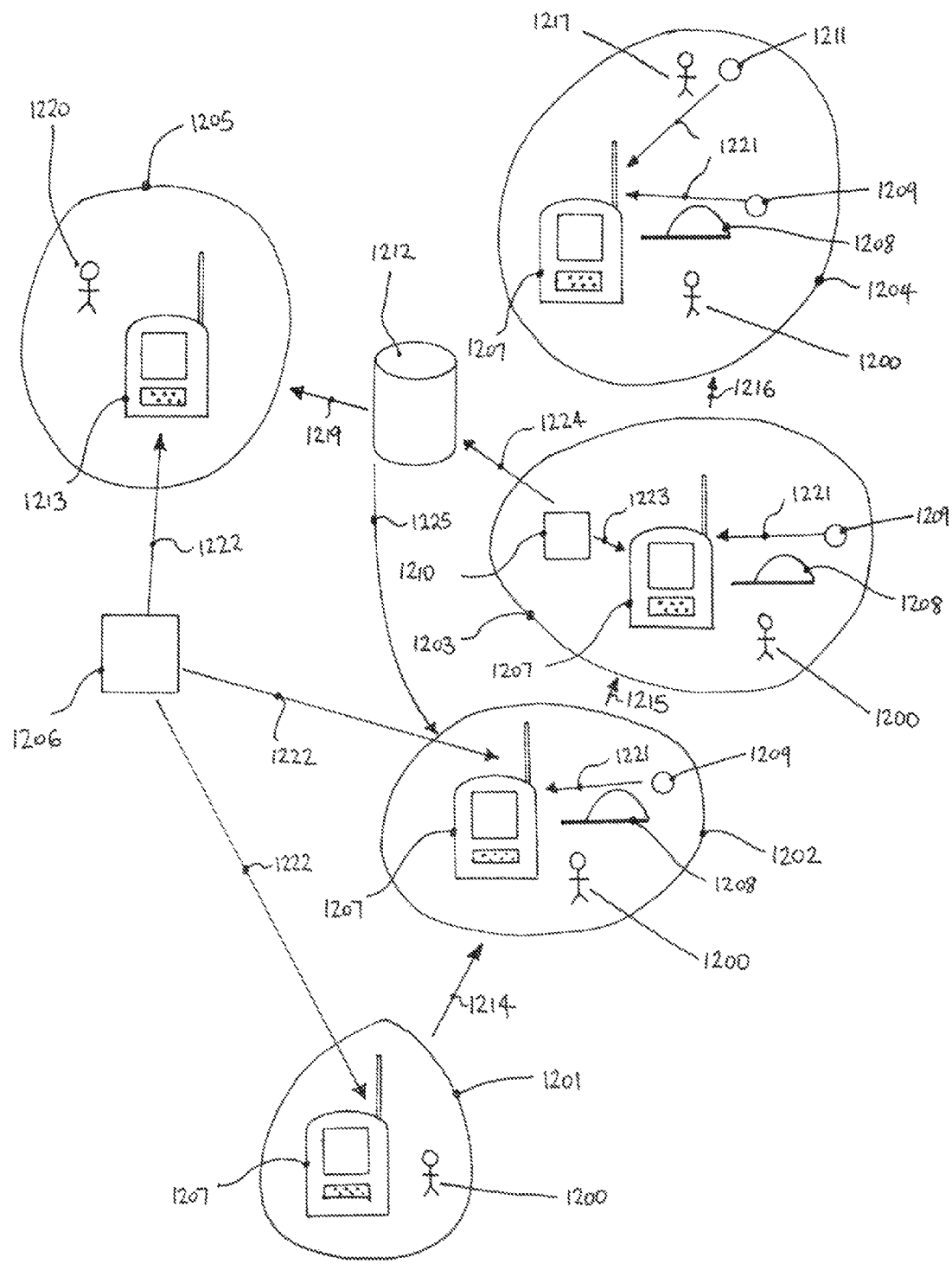
FIG. 12 depicts one embodiment of a use case of the system showing one possible way the system functions as a user makes a hypothetical journey.

FIG. 12 depicts one embodiment involving a journey that a user may take and the way in which the grid of sensors and other elements of the system can provide UV exposure readings. Referring to FIG. 12, it shows a user 1200 possessing a mobile computing device 1207 of type 200 in a first geographical area 1201. The user's mobile device can calculate the UV exposure from UV readings from a city wide reading 1206 of type 205 being the only UV reading available. The city wide reading 1206 is communicated to the mobile computing device 200 as shown by 1222. The user moves to a second geographical location the journey is shown as 1214 arriving at a second geographical area 1202. The user 1200 also places a hat 1208 on his head that has a UV sensor device 1209 of type 199. From this geographical location 1202, the user's mobile device 1207 can calculate the UV exposure based on a reading from UV sensor 1209 as well as from a city wide reading 1206 as well as a UV value from a server 1212 of type 207 from a fixed accurate sensor at a for example a beach club 1210 of type 203, that is sent to a database server of UV readings 1212 for storage with an associated GPS location. The city wide reading 1206 is communicated to the mobile computing device 200 as shown by 1222. The reading from the server 1212 is communicated to the mobile computing device 200 as shown by 1225. The algorithm chosen in this hypothetical scenario uses the average of the city reading 1206 and the local reading on the individual 1209 and the value from a database server of UV readings 1212 as one possible implementation because the position from 1210 is the same distance from location 1202 as the distance to the city reading 1206 location. The user makes a second geographical journey 1215 to a geographical location 1203. From this location the user's mobile 1207 can read a city wide reading 1206 as well as the local reading 1209 from a device near the user, and a new fixed sensor 1210 of type 203, reading is acquired from a low power rf link using Bluetooth low energy. The fixed accurate sensor at the beach club 1210 of type 203 is communicated 1223 and used as the only reading being accurate and close to the user 1200. The fixed accurate sensor 1210 is reported as shown by 1224, to server 1212 for use by other users. The user makes a third geographical journey 1216 to geographical location 1204. From this location a the user's mobile device 1207 can read a city wide reading 1206, a UV reading from a second user's UV sensor device 1211 of type 199 via a low power rf and a local reading from the user's uv sensor device 1209. As location 1204 is distant from location 1203 and 1206, the algorithm chosen to calculate the UV reading is the average from UV sensor device 1211 and 1209 both being very close. A third separate user 1220 is also depicted at location 1205 which is 2 km from 1206 and 1 km from 1203. Using the location of 1205 a lookup to the database 1212 retrieves UV readings at times from 1210 shown as 1219. The mobile computing device 1213 for user 1220, calculates the average of three values consisting of two values 1219 and one value 1206 to reflect the increased weighting of importance to the twice as close value 1210 shown as 1219. In this manner a user such as 1220 without a UV sensor can benefit from the UV sensors on the grid.

For reference with FIG. 12,

1200—User with mobile computing device 1207
1201—First Geographical Area that the user is located in
1202—Second Geographical Area that the user moves to from 1201
1203—Third Geographical Area that the user moves to from 1202
1204—Fourth Geographical Area that the user moves to from 1203 and also encloses a second user 1217
1205—Fifth Geographical Area where a third user 1220
1206—City wide UV reading using device 205
1207—User's mobile of device type 200
1208—User's hat
1209—UV sensor device 199 mounted on hat 1208
1210—Fixed UV sensor of type 203
1211—UV sensor of type 199 near individual 1217
1212—Database storage of type 207 receiving UV reading 1224
1213—Mobile Computing Device of type 200 belonging to a third user 1220
1214—User 1200 Journey from 1201 to 1202
1215—User 1200 Journey from 1202 to 1203
1216—User 1200 Journey from 1203 to 1204
1217—A second user in area 1204
1218—UV sensor reading from 1210.
1219—UV sensor retrieved by 1213 from 1210
1220—A third user in geographical area 1205
1221—network with low power RF, bluetooth (blue tooth 4 or Ble or Bluetooth Low Energy) or blutooth (c) between devices of types 200 and 199 communicating sensor readings including UV reading
1222—UV reading from 1206
1223—UV reading from 1210
1224—UV reading reported to 1212 from 1210
1225—UV reading from 1212

Bluetooth Low Energy connected UV sensors allow permanent low cost distributed placement on apparatus such as prams, hats, as well as at locations such as gardens, beaches, golf courses, swimming pools where they can exist for long periods of time due to low energy requirements providing localised real time measurements. They immediately alert the user if in the location of UV exposure levels with or without user interaction to initiate a check when they move into range of the fixed sensor device 199. Typically sensor and device are one unit or when two separate units maintain proximity moving together and one sensor device for one display alert device in contrast this system the Mobile Computing Device 200 showing display and alert and the device 199 do not need to be always moved around together and can work together ad hoc when they come in range of each other. There may also be one to many sensor devices 199 mapped to one to many display Mobile Computing Device 200. In some embodiments, sensors within range are automatically acquired or dropped as a device goes in and out of range with the sensors. Automatic acquisition allows users to not worry about pulling out the device to check. When the user and phone move in and out of range of these devices the phone is monitoring for new devices and connecting/disconnecting from them. In this way the user can be alerted without even thinking to check UV by coming into proximity of objects (hat, pram, etc., . . . ) and places garden, beach etc.

UV Sensors 199 placed by users can be shared to other users creating a network or grid of UV exposure sensors. This creates a collaborative grid of UV sensors for community benefit. Important features to the concept of a grid of UV sensors is the ability to firstly, acquire and expire new UV sensor values. As the user moves into range to acquire UV sensor values and out of range to expire UV sensor values no longer relevant for consideration because out of proximity of the user and secondly, to be able to have UV sensors 199 share values between each other peer to peer by low power radio frequency networks such as Bluetooth low energy or via a mobile computing device 200 by using GPS location to lookup UV sensor values stored on a server or to upload UV sensor values at a GPS location, and thirdly, to apply algorithms to the UV sensor values located within range for consideration to determine an overall cumulative UV radiation reading for the individual based on available UV sensor readings.

As the user carrying a UV sensor device and mobile device moves around the UV sensor device and or also the mobile device 200 may connect to other UV sensor device and or also mobile devices and gain new UV readings. These can be used in the calculation of an updated UV exposure level which is taking into account new relevant positional data. As the user moves around the GPS position on the mobile device 200 can also be used to lookup the collection of real time or stored UV radiation values from UV sensors other than only the individual's for example, on a peer to peer basis from other device located at varying distances from the user as well as collection from other sensors positioned locally as well as in the same local area, city or state by GPS lookup of real time and stored UV sensor values from a central server to which UV radiation readings have been measured and sent by other devices. This gives the chance to also collect and apply statistical methods on the set of measurements from this grid of sensors such as averaging, worst case, or distance weighting to provide a measurement value.

FIG. 12 describes one hypothetical example of journey that illustrates the interaction of elements of the system.

In one example of an algorithm to calculate the UV reading when multiple sensors are involved, there are two local sensors that are readable because they are close to the Mobile computing device 200, and can use the low power rf network. They are each given a high weighting of say 3 out of 10 units, with the other 3 units based on a reading from the local suburb and 1 unit from the city reading. These values are then averaged by dividing by 10 to arrive at a averaging system based on distance. Other weighing systems can also be created.

Given a set of two or more UV sensor readings the algorithm may in one typical implementation choose the worst case value with the highest cumulative UV reading for the period that the user was measured. Alternatively the worst case instantaneous value from any one of the UV sensors may be used.

When the system has even one local UV sensor device 199 and a second UV sensor is available remotely via the mobile computing device 200 looking up the current GPS value of the system to which a UV sensor value is mapped to return the value for the city then a grid exists over which an algorithm can be applied. The advantage of the grid in this case is that even with only two values there is the ability to determine from the city value a base line value from which in one implementation the minimum value can be determined from this base line value so that even if the user's UV sensor with him is reading a low value or even zero, there is at least a baseline level so that at no stage is the calculated sensor value ever a low value near to zero because the sensor is in the wrong orientation pointing away from the sun or even damaged. When the value of the local UV is higher than the baseline then this would be used so that in all cases the higher, conservative value from the standpoint of measuring for calculation to warn of overexposure is used. An average value may also be useful.

The mobile computing device 200 may also have no UV sensor 199 device nearby, but can use a GPS determination of the current location to lookup all the UV sensor value for the grid from a remote server. As long as there are UV sensor values shared by devices collaborating by sharing by uploaded their UV sensor reading to the server there will be the opportunity for other mobile computing devices to function.

When a UV sensor 199 or Mobile Computing device 200 is requested to provide a UV cumulative value by another such device 199 or 200, it returns a cumulative UV value for the time period specified by start and stop time and also duration. Instantaneous values can also be received. The orientation of UV sensor as determined by the accelerometer is also returned so that the calculation can know that the UV value is not taken from direct sunlight and adjust the value depending on the time and day.

If accuracy or the priority of the sensor is indicated then it's UV reading may be given a higher consideration in the calculations. If the type of positioning of the sensor is indicated such as on a pram, or by a swimming pool, then factors such as more sensitive skin, in the case of the pram associated with a baby being near the pram or less clothing in the case of the pool may be considered in the calculation of UV radiation protection and skin type. For example the skin type may be set to the fairest level to adjust for more sensitive bad skin, so that the calculation more quickly determines over exposure. Where the UV sensor value is stored the difference between the time of measurement is important to the relevance of the reading to the time at which is requested. UV sensor devices 199 and mobile devices 200 may automatically connect and collect real time or stored UV radiation values from other mobile devices and UV sensor devices as they move into range of each other.

In one embodiment, UV sensors can via a connection to a mobile device equipped with GPS, or via other such computing device at a know location, have their measured UV sensor values reported to server from where other mobile devices at a similar GPS location may request UV radiation values stored on the server for the location and range matching to some extent to the GPS location of the requesting mobile device.

If a user was in position for a period of time and reported UV reading to a server 207, then within a given time period while the value is still relevant perhaps 15 mins, then a second user can retrieve and use this value if they are within a certain distance of the original UV reading position. In one embodiment where a user is located between UV readings the distance ratios are used to determine the proportion of each UV reading value to be considered in the resultant value. Where two readings exist one being 1 km away and the other 2 km, then an average of three values, two from the value at 1 km and one from 2 km are summed and divided by three. Where high accuracy type sensors are in range they may be used as the override UV reading. In some cases a conservative algorithm would use the highest UV reading while algorithms giving preference to the priority of the individual UV reading from UV sensor device 199, may have the advantage of being responsive to the users movement into shading as one example to manage their UV exposure.

In one embodiment, government or organisations or individuals can deploy fixed sensors 203, or moving sensors 199 for consumption by mobile devices 200 which are part of the system. In return for UV readings published to the grid system advertisements could be displayed on mobile computing device 200 consuming these values or some other charge imposed for the use of the UV readings. Each UV sensor device 203 or 199 can be given an identification number so that the remuneration can be connected with a specific device owner. Fixed sensors 203 can be placed on moving objects such as boats or in set locations such a buildings. Fixed sensors 203 can directly communicate with the internet or wifi or alternatively use low power rf communications such as Bluetooth or Bluetooth low energy to communicate with a mobile computing device 200 that transfers the UV sensor information to a database 207. The mobile computing device 200 can be permanently associated with the UV sensor, or be any mobile computing device that comes into range of the UV sensor device temporarily and makes itself available as a channel for communicating the UV sensor value or any other value from the sensor device 199 to a server database 207 and further to FIG. 1, including also sensing wind speed and direction as well as rain fall with either traditional gauges or just using conductivity to give a binary information, yes, no for rainfall. These could be stored in the database 207 and shared as UV as well as also including general weather information to users and third parties including via applications, websites, web services. In order to provide this mechanism the application on the mobile computing device 200 has a background monitoring task that is checking for UV sensor devices wishing to communicate.

In one embodiment, any value the sensor device 199 can measure as well as other additional weather related values including wind, rainfall measured from the moisture sensor on the device 199 or using other known methods can be reported to a database 207 and used by a processor 208 or in other ways to display and share localised weather data to mobile devices 200 and users via a website and web services.

In one embodiment, it is important to identify when the UV sensor device is correctly measuring a low value because the user has moved into shade. For a given set of GPS locations of mobile devices 200 and UV sensors 199 at vary closeness to the mobile device 200 if over many occasions and users and time, a similar lower UV level indicating shade is measured, the GPS location is determined to be in shade. Terrain map information can also be used to determine if an area is in shade because the user is located inside a building or tree area as some examples. The significance of measuring shade correctly is that the cumulative UV exposure is reduced for this time in shade and it should be correctly determined that the user is in shade to give a true UV cumulative total.

In one embodiment, as an alternative to using GPS for location determinate wifi and or also radio tower triangulation and other methods can be used to determine location.

In one embodiment a user profile, user location and UV sensor readings are stored in a database 207 and a processing unit 208 determines when a cumulative UV has been exceeded and sends a alert to the users mobile computing device 200 and or also device 199.

In one embodiment, if no GPS location can be determine consistently for one or more attempts separated by time and users then this location can be considered to be inside and so in shade or low UV level of 0 to 2.

In one embodiment, the UV sensor device only measures UV values when a mobile computing device 200 is in range.

In one embodiment, to determine whether the user is out of range of UV radiation the user GPS location can be cross reference against maps to see if the user is inside or outside, or near areas affording shade or not.

In one embodiment, sensor mounted on products that have a correct usage orientation such as hat, pet collar, hair clip, helmet which need the sensor on the upper side of brim to be facing up to measure, devices such as accelerometers or tilt switches could be used to check that item is being oriented correctly and algorithms only use values from such items when the orientation is correct. If the angle of orientation can be determined then the value can be adjusted.

In one embodiment, UV sensor devices are configured to check for UV readings regularly during day light hours according to a clock.

In one embodiment, when one or more UV sensor devices 199 are in proximity and they are not fixed therefore having the chance of not being orientated to acquire the maximum UV exposure, then taking the highest value provides a safer conservative UV reading selection.

In one embodiment, when one or more UV sensor devices 199 are in proximity and they are not fixed therefore having the chance of not being orientated to acquire the maximum UV exposure, then taking the highest value provides a safer conservative UV reading selection. If a city UV reading 205 is also available, then taking the overall highest value including this city UV reading provides a safer conservative UV reading selection.

In one embodiment, when one or more UV sensor devices 199 are in proximity and they are not fixed therefore having the chance of not being orientated to acquire the maximum UV exposure, then taking the highest value provides a safer conservative UV reading selection. However, if a fixed UV reading 203 is in proximity then this value should be selected.

In one embodiment, a sunscreen, cosmetics or moisturiser application device or a hat, clothing contain input devices such as switches linked to the system by low power rf. When they are applied or warn then any active alert on the devices 199 and or 200 is cancelled in consideration of the reapplication of sunscreen and or wearing of protective clothing. The user may also receive some reward for compliance. The input device can be a switch activated when a plunger is pressed, a force or pressure sensor 111 changing when the container squeezed or in other ways contents are dispensed to the dispensing of sunscreen, cosmetics or moisturisers, in the case of clothing, sun screen dispensing, wear of a hat, and other examples an accelerometer 108 in x, y, z directions may indicate the user is wearing the clothes or if there are movements indicating the opening of a sun screen dispenser, cosmetics or moisturisers.

In another embodiment, a single UV sensor device 199 can be placed with UV sensors facing upwards. The device is either set by an input button on the device 199 or through setup on through the mobile computing device 200 to be placed in a fixed position mode meaning that the value measured is to be considered as if the sensor is vertically orientated and so considered as an accurate fixed measurement. Using the time of day and therefore the angle of incidence to the sensor and the UV radiation level measured and time the UV radiation level can be calculated. Should the device be moved then the device is considered to have exited this fixed move and an indication given. In other configurations, two or more sensors could be used to collect the UV radiation at various angles as it passes from east to west. In some modes the device would be aligned east to west line to simplify calculation of the resultant UV radiation angles. The alignment of the UV sensor can also be sensed by the use of a compass 129 in the device 199 and the user shown when it is in alignment, or if as shown in FIG. 11, a cube arrangement of sensors are employed then using the compass the device can determine from the time of day and orientation of the device the UV reading at any point in time. As well as the cube and single sensor configurations, other configurations including two sensors arranged in a tent like configuration with a joining edge, aligned east to west could be used so that the UV radiation as morning and afternoon angles can be more accurately measured.

In one embodiment, the application or service 204, can be a foreground or background task capable to initiate or receive connections, including for monitoring or polling for connection requests or availability of devices to communicate from, but not limited to lower power RF such as, but not limited to, Bluetooth, Bluetooth 4.0 Bluetooth Low Energy wifi as well as from Mobile Device communication protocols. Android Phones are one example which are capable of background monitoring for connections to lower power RF including when there is no bluetooth connection.

In one embodiment, the device 199 can be co-located or incorporated into a device which can display information readable on the inside of glasses by a user such as Google Glass or similar products. The UV and other sensor values, and other derived measurements such as Vitamin D, Cumulative UV, high visible light intensity, and skin ageing, Sunscreen reapplication alerts, in the area surrounding the user, or the area the user is looking at, can be display on the glasses for the user to read as numerical, graphical overlaid information including use of graduations in color corresponding to various intensities.

In one embodiment, UV and other sensor data at various locations where a measurement was acquired stored in a database 207 can be used to generate a map representing areas with different colors to denote UV levels at that point and graduated values between points. The portion of the map that corresponds to where the user is currently looking can then be displayed by a device which shows overlaid information on the inside of glasses by a user such as Google Glass or similar products. The UV and other sensor values, and other derived measurements such as Vitamin D, Cumulative UV, high visible light intensity, and skin ageing in the area surrounding the user can be displayed. This allows the user to see easily where to find protection from UV radiation.

In one embodiment, the time remaining for reapplication of sunscreen can be represented to the user on device 200 or otherwise as a time count down for hours, minutes and seconds before reapplication is required.

In one embodiment, referring to device 199, the accelerometer is used to determine the angle of orientation of the device and combined with a compass and the orientation of the UV and other sensors on the device, the orientation of the sensors to the UV, light and other sources can be determined. This can be combined with the time of day, and GPS location, to determine the exact level of UV radiation. for the position. This information can also be used along with the retrieval of three dimensional, 3D, terrain information from a database to determine if the UV or other sensor readings are affected by terrain elements, for example trees, mountains, buildings. In one application this allows the system to verify that a change in UV readings has been correctly measured because the change is for example, the result of terrain blocking the UV reading and not the accidental covering or misalignment of the sensor, such as it facing the ground. A similar lookup of weather conditions could also be used to determine if for example cloud cover may account for this. Time of day, combined with GPS location can also be calculated to see if they account for the change in UV and other readings. Head mounted equipment such as Google Glass and other similar devices that have a predictable orientation can be used to mount the device 199 as well as shoe, hat, shoulder, hair clip. Where such devices have the ability to determine orientation angle and direction of facing, then these features available in the device can be used to determine the orientation of the sensor.

In one embodiment, referring to device 199, the accelerometer is used to determine the angle of orientation of the device and combined with a compass and the orientation of the UV and other sensors on the device, the orientation of the sensors to the UV, light and other sources can be determined. This can be combined with the time of day, and GPS location, to determine the exact level of UV radiation. for the position.

The devices 199 can be designed to be Disposable as well as water proof. This encourages their placement in key locations where UV exposure may be experienced. The devices 199 can report their battery low status to the smart device 200 so that the user can be alerted when the device may fail from low battery. The alert may be generated by the device 199 itself having measured the UV exposure or via the device 199 pairing using low power RF such as Bluetooth 4 with a Mobile Computing Device 200 running an application or service 204 where the application 204 generates the alert. The application or service 204 running on the smart device is aware of the alert message from the device 199 because it has a listener mechanism waiting to receive alerts from low power RF connection or because the application of service is monitoring for a connection request from the device 199 or finds the device 199 is available for connection and connects to it or finds it advertising. Additionally, an algorithm may be performed with the readings from the grid of UV sensors.

If the smart device has a default profile then the UV exposure reading are automatically applied against for example the default profile's user skin type to determine customised cumulative warning when burn time for a skin type will be exceeded. Using the Bluetooth Low energy (Bluetooth 4) or other lower power RF the Mobile Computing Device 200 or device 199 can locate other sensor devices 199 with UV exposure readings (or other readings) that it may build into it's UV reading displayed to the user. Using the GPS location of the device 200 other nearby UV readings can be received from a server 208 and database 207 accessible via the internet. The device 199 can also share the UV exposure reading (as well as other readings) with other devices 199 or Mobile Computing Device 200 or via the smart devices 200 tagged with the smart device's GPS location via the internet with other smart devices 200. A device 199 or Mobile Computing Device 200 can in this described manner have access to a continual supply of UV exposure reading in any area where a UV exposure reading can be retrieved based on a GPS location or via a lower power RF (for example Bluetooth 4) connection to another device 199 or Mobile Computing Device 200.

The advantages of such a network of available UV readings include:

Several readings can be averaged or worst case taken for a more accurate or conservative UV exposure reading. This also helps eliminate erroneous readings.

UV exposure values can be retrieved from more accurate or better placed sensors for example a dedicated sensor in a pool.

When only a Mobile Computing Device 200 is available by use of other supplied UV exposure readings from other devices the user may operate the application 204.

When the connection between the device 199 and the Mobile Computing Device 200 is lost either device may attempt to establish the connection. In the case of the Mobile Computing Device 200, it may poll regularly to see if a device 199, is available for a connection.

Over exposure, skin cancer risk, and ageing can all be calculated to begin occurring before the time remaining until protection occurs has run out to reflect that the near the end of a life time of a sun screens application the protection's effectiveness degrades. This may be done by applying an additional multiplier that is proportional to the time remaining. A risk increase multiplier could also be applied that is proportionally increasing to the time the sunscreen has not been reapplied. Another risk multiplier can be applied for the chance that the sun screen is not completely applied to all exposed areas of the body. This multiplier may be adjusted higher if the sun screen is being applied to child who are generally more difficult to apply sun screen to.

If a UV sensor value is taken from another value in the city area and has a different altitude that it is different form the altitude sensor on device 199 then an altitude offset can be added to the value UV sensor value to account for the higher or lower location of the user relative to reading altitude. For example,
//estimate 15% for 1000 m=0.015% for every meter
Altitude=altimeter sensor 109
UVFromAltitude=0.015*Altitude;

In one embodiment, the 199 device performs sensing only with calculations being performed on the Mobile Computing Device 200, computer or some such device. An alert may be sent back to 199 device. The users own 199 device is not required, all calculations are performed using measurements received by internet from other sources or from other 199 devices. In this mode an application 204 or "app" receives measurement values by supplying it's GPS and receiving the nearest available sensor information. For example, the nearest UV reading or prediction for time of day is requested by supplying the GPS from Mobile Computing Device 200 to devices on the internet or pairing with devices such as 199. The GPS position would then allow altitude, terrain and weather along with temperature (and hence the likelihood of sweating) as well as activity based on the type facility of location such as being at a swimming pool or beach which could be used to deduce if water activity should be indicated. In one embodiment, the accelerometer could be used to infer the orientation of the sensors with respect to the sun and use the orientation used to determine the component of UV radiation that is direct and reflected. In one embodiment, the 199 sensors may publish and receive results to and from other sensors on 199 and 200 devices. When reported via Mobile Computing Device 200 devices to the internet and tagged with gps then these readings can be used by other devices with a GPS closest to the reading. In one embodiment, several different skin type ratings systems in addition to the one presented exist. The algorithms presented can be tailored to each of these different systems.

In one embodiment, the battery can be replaced or supplemented with energy harvested from the solar panel 118 and stored in a capacitor and delivered by associated electrical circuitry 128 to the device 199. In one embodiment, the user can have a device 199 which we will denote "device 1" consisting of no sensors and only display and audible alarm which can receive a signal from a second device denoted "device 2" device 199 which has a UV radiation sensor detecting UV radiation above a level and sending an alert to be sent to "device 1".

In one embodiment, the logging of the product can be used to award points to user as a form of game to incentive them to comply with safe UV exposure practices such as wearing sun screen, clothing and hats. Referring to FIG. 3, when UV exposure is measured by sensors on the device 303 and the child is detected to be wears a hat based on sensors 301 or 302, then points can be awarded that are displayed on the Mobile Computing Device 200 and can be stored on a database 207. These points can be used as a motivation in their own right or used to redeem prizes from an online or physical store by way of coupons that may be printed or electronically communicated to the online or physical store. The application of sunscreen can be associated with the rewarding of points by pressing a button 112 on the device 199 or Mobile Computing Device 200 or by scanning the code on the sun screen bottle as described in FIG. 7. When the button 112 is pressed or the code is scanned then it is considered that the user has applied sun screen and should be awarded points. When an alarm on the device 199 is triggered indicating that sunscreen needs to be reapplied and then as described above this is indicated then extra points may also be awarded for re application a second third time to further incentivise the user to reapply sun screen.

In addition to the advantages which may be achieved by implementation of the individual components of the system, some embodiments of the system provide additional advantages over conventional technology. In some embodiments, Bluetooth Low Energy connected UV sensors allow permanent low cost distributed placement on apparatus such as prams, hats, gardens, beaches where they can exist for long periods of time due to low energy requirements providing localised realtime measurements. They immediately alert the user if in the location of UV exposure levels with or without user interaction to initiate a check when they move into range of the fixed sensor device 199. Typically in prior art, the UV sensor and device are one unit or when two separate units maintain proximity moving together on an individual and one sensor device for one display alert device in contrast in the system described here, the Mobile Computing Device 200 showing display and alert and the device 199 do not need to be always moved around together and can work together adhoc when they come in range of each other. There may also be one to many sensor devices 199 mapped to one to many displays on Mobile Computing Devices 200.

In some embodiments, UV Sensors placed by other users can be shared to other users creating a network or grid or UV exposure sensors. This creates a collaborative grid of UV sensors for community benefit. In some embodiments, A user can use the system via the application 204 on the smart device without a physical sensor by using other UV sensors stored at a central server. The server may have UV readings for various GPS locations uploaded by users who opt to share their UV readings. When the UV readings are uploaded, the GPS and time is recorded as well as cumulative UV exposure over time and instantaneous UV value. This allows an application without sensor device 199 attached to use the GPS location of its host mobile device to lookup a UV readings from the server and perform calculations of UV exposure using algorithms described.

In some embodiments, all sensors measured by the sensor device 199 placed by other users can be shared with other users creating a network or grid of said sensors. This creates a collaborative grid of sensors for community benefit. In some embodiments, A user can use the system via the application 204 on the smart device without a physical sensor by using other sensor values stored at a central server. The server may have sensor readings measured by the sensor device 199 for various GPS locations uploaded by users who opt to share their sensor readings. When the readings are uploaded, the GPS and time is recorded as well as the sensor values. This allows an application without sensor device 199 attached to use the GPS location of its host mobile device to lookup a sensor readings from the server and perform calculations of using different values using algorithms described. The temperature, humidity, UV, heart rate, accelerometer and moisture sensors as well as weather information from a server can be used to calculate skin ageing for a user as they move around. The UV exposure can be used to calculate Vitamin D generation. The range of sensor values can be used to measure and calculate weather parameters. Using map information which indicates areas of complete sun and weather exposure, partial sun and weather exposure and indoors the UV exposure, Skin Ageing and Weather values can be used to adjust the reading as the user enters partial exposure to complete protection from exposure to no reading for complete protection.

In some embodiments, energy is harvested to prolong or replace need for a battery. Some embodiments calculate UV exposure beyond direct UV exposure published by authorities by reflection measurement (for example placement of sensor above/below hat) or inference of reflected UV levels based on a look up of terrain and altitude.

Some embodiments calculate Vitamin D dosage achieved and warn when weekly UV exposure not on track to achieve target Vitamin D generation. Some embodiments display of UV over exposure, Skin Damage/Ageing and skin cancer risk. In some embodiments, a Theft Warning system warns when the device 199 warns the user at distance from smart device 200 (for example in water) and the Mobile Computing Device 200 senses via it's accelerometer movement of phone or objects joined to the phone. Some embodiments include a QR or similar code reading of skin protection products. Some embodiments include storage of user long term exposure to database for physician analysis, research and data mining for health research. In some embodiments, instantaneous display and alerts allow experimentation and rapid adaption of behaviour to minimize personal instantaneous exposure. Useful for tourists, sun bakers, etc. For example: cosmetics—moisturisers restore effects of UV exposure and temp, dryness etc.; sunscreen degradation, sweat from activities or temp sweat or water activity; built in recommendation about more appropriate cosmetic/sunscreen protection products based on analysis of collected sensor data about a user; water safety—if the device the child is wearing is no longer contactable for a variable period of time.

Some embodiments alert the user either directly wearing the hat or device or another user who can monitor if a hat is being warn for example for a smart phone 200 or if the hat or other device has been taken off and there is UV radiation present.

In some embodiments, the all the settings made on 200/204 can be downloaded onto the device 199 and the calculations can be performed on the device 199 and alerts made on display and audio on the 199 or the alerts sent to the Mobile Computing Device 200 where they are done there. In some embodiments, all the sensor readings are sent to 200/204 where calculations are done.

In one embodiment, all methods described to measure and calculate UV exposure values including described algorithms can then be used to calculate Vitamin D exposure factoring but not limited to, skin type and clothing. Desired Vitamin D dosage on a daily, weekly or monthly basis can be calculated and compared to target levels and alerts and information about progress displayed.

In one embodiment, when all values including for UV radiation and other sensors included on the sensor device as well as additional weather information measured remotely to the user, are used in calculations the time difference between the calculation time and measurement time, the distance from the user, the accuracy of the reading equipment including the predictability of it's orientation as well as the importance based on location for example in a pram near a children who have more sensitive skin, are combined with weightings proportional to these factors to determine an overall sensor readings for each type of sensor value being considered.

In some embodiments, Blue Tooth Low Energy (Bluetooth 4.0, Bluetooth LE) is one method for communication between the device 199 and the Mobile Computing Device 200. In some embodiments, a UV sensor pairs with smart device application via low energy rf.

In one embodiment, sensor devices 199 attached to moving objects and vehicles including but not limited to buses, cars and private vehicles use a Mobile Computing device 200 to communicate sensor values measured by 199 over a connection to a server 207. The mobile computing device within range of the sensor device 199 on the vehicle can be permanently mounted with the sensor device 199, or moving in and out of range of the sensor as it passes it during movement, or the sensor device 199 and Mobile Computing Device 200 could be temporarily in range for a period of time such as when a passenger rides on a bus that has a sensor device 199 with a reading ready to be sent to the server 207 in which case the passenger's Mobile computing device 200 is configured to receive a connection and the sensor measurements from the sensor device 199 and communicate them to the server 207. In this manner sensor device 199 mounted on many moving points such as buses can be deployed and used to build a dynamic grid map of sensor values for a large area and many sample positions and times limited only by the extent to which a vehicles travels to an area and at what time. Where multiple values are received for a given location and time period, algorithms including averaging and other previously described calculations can be applied. In this manner UV Weather and Skin Damage readings can be collected for a grid of values for use by users include via lookup from the server 207 from the user's Mobile Computing Device 200.

In one embodiment, the system described in this disclosure can be used to build a grid of air pollution and air quality sensors to measure for pollutants such as diesel exhaust as a carcinogen. Other outside pollutions include CO, Ozone, Sulfur dioxide, Nitrogen Oxides, lead. This will allow users to have access to localized pollution readings and have the opportunity to plan their lifestyle to avoid high pollution areas.

In some embodiments, one or more sensor devices in any of the configurations described can be incorporated into existing devices such as watches, jewelry, and sports and recreational equipment, including watches such as Iwatch©

In one embodiment, the ability of the system to allow the detection of UV sensors 199 as they enter the low power RF reception range of a mobile computing device 399 and to allow the UV sensor 199 to report UV sensor values as well as other sensor values to a remote server using this Mobile Computing Device 399 provides the advantage that many small UV and other sensors devices as well as other sensor devices with lower power RF communication capability can be placed as small profile, inexpensive units, in remote areas or areas where communication wiring is not convenient or possible, with infrequent need to change the power supply or potentially using solar, motion or other mechanical generation, or electrical power scavenging and needing no or less battery frequent battery replacement. These advantages are afforded by not needing to perform longer distance radio communication or connection by wire, which have higher power requirements and hence larger batteries and also unit size and cost. The placement of many of these small sensors periodically along a pathway or throughout an area such as a city could provide low cost deployment of a UV grid system. When a user is out of range of any sensor, perhaps between them the UV or other sensor reading could default to the last read value until a new value from a device is obtained.

In one embodiment, a UV sensor 199 can be placed at the bottom of a ski lift and provide updates to skier's mobile computing device 200 as they pass into range each time they use the lift. A software application 204 on the mobile computing device 200 calculates cumulative UV exposure as well as other sensor based data and alerts such as relating to weather information.

Other embodiments can readily be implemented by one skilled in the art by taking the disclosed arrangements and applying them to other protective products such as toothpaste dispensers, tooth floss dispensers, soap dispensers, makeup remover dispensers and others.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

An embodiment of a UV Sensor system includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. An sunscreen dispenser usage reporting system, comprising:
   a remote sensor device incorporating a processor and one or more sensors selected from the group consisting of an electrical switch, a contact switch, and a button, configured to sense usage of said sunscreen dispenser;
   a mobile computing device;
   a low power radio frequency communication link between said remote sensor device and said mobile computing device;
   wherein:
      said remote sensor device is configured to report sunscreen dispenser usage events to said mobile computing device by said low power radio frequency communication link; and
      said mobile computing device is configured to acquire an ultraviolet radiation level from a remote server corresponding to the current location and generate a sunscreen dispenser usage reminder report based upon the combination of said ultraviolet radiation level and said sunscreen dispenser usage events.

2. The system of claim 1 wherein said sensors include a force pressure transducer.

* * * * *